US011935201B2

(12) United States Patent
Tan et al.

(10) Patent No.: US 11,935,201 B2
(45) Date of Patent: Mar. 19, 2024

(54) METHOD AND APPARATUS FOR USING PHYSICAL DEVICES IN EXTENDED REALITY ENVIRONMENTS

(71) Applicant: Dell Products, LP, Round Rock, TX (US)

(72) Inventors: Loo Shing Tan, Singapore (SG); Michiel Knoppert, Amsterdam (NL); Gerald Rene Pelissier, Mendham, NJ (US); Martin Douglas Sawtell, Singapore (SG)

(73) Assignee: Dell Products LP, Round Rock, TX (US)

( * ) Notice: Subject to any disclaimer, the term of this patent is extended or adjusted under 35 U.S.C. 154(b) by 0 days.

(21) Appl. No.: 17/731,882

(22) Filed: Apr. 28, 2022

(65) Prior Publication Data

US 2023/0351702 A1    Nov. 2, 2023

(51) Int. Cl.
*G06T 19/00*     (2011.01)
*G06F 3/01*      (2006.01)
*G06V 20/20*     (2022.01)
*G06V 40/20*     (2022.01)
*G10L 15/22*     (2006.01)

(52) U.S. Cl.
CPC ............ *G06T 19/006* (2013.01); *G06F 3/017* (2013.01); *G06V 20/20* (2022.01); *G06V 40/20* (2022.01); *G10L 15/22* (2013.01); *G10L 2015/223* (2013.01)

(58) Field of Classification Search
CPC ....... G06T 19/006; G06F 3/017; G06V 20/20; G06V 40/20; G10L 15/22; G10L 2015/223
See application file for complete search history.

(56) References Cited

U.S. PATENT DOCUMENTS

| | | | |
|---|---|---|---|
| 8,427,396 B1* | 4/2013 | Kim | G02B 27/017 345/8 |
| 9,613,448 B1* | 4/2017 | Margolin | G06T 11/001 |
| 9,996,308 B2* | 6/2018 | Park | G02B 27/017 |
| 10,026,229 B1* | 7/2018 | Yalniz | G06T 7/74 |
| 10,365,716 B2* | 7/2019 | Aimone | G09G 3/003 |
| 10,527,848 B2* | 1/2020 | Nakamura | G09G 3/001 |
| 10,656,720 B1* | 5/2020 | Holz | G06F 3/011 |

(Continued)

FOREIGN PATENT DOCUMENTS

JP    2004258123 A  *  9/2004

*Primary Examiner* — Motilewa Good-Johnson
(74) *Attorney, Agent, or Firm* — Prol Intellectual Property Law, PLLC; H. Kenneth Prol

(57) ABSTRACT

An information handling system operating an HMD device may include a video display device to display application images or a fiducial image when the HMD device is worn by a user; the HMD device including: a display device in the HMD device to present to a user an XR (XR) image of a surrounding XR environment; a pass-through camera to detect the fiducial image displayed by the video display device; and an HMD processor to receive data from an HMD wearing sensor indicating that the user is wearing the HMD device and execute computer readable program code to display an XR environment to the user including an XR image version of the application images presented to the user via the video display device; wherein detection of the fiducial image triggers an API with the XR image version of the video display application images via the video display device.

20 Claims, 7 Drawing Sheets

(56) References Cited

U.S. PATENT DOCUMENTS

| | | | | |
|---|---|---|---|---|
| 10,750,162 | B2* | 8/2020 | Goossens | G06F 3/011 |
| 11,120,630 | B2* | 9/2021 | Choi | G06F 3/011 |
| 11,140,317 | B2* | 10/2021 | Lee | G06F 3/012 |
| 11,378,805 | B2* | 7/2022 | Watanabe | G02B 27/0172 |
| 2014/0015736 | A1* | 1/2014 | Kim | G06F 3/013 |
| | | | | 345/1.2 |
| 2014/0361976 | A1* | 12/2014 | Osman | G02B 27/017 |
| | | | | 345/156 |
| 2016/0341959 | A1* | 11/2016 | Gibbs | G06V 20/20 |
| 2017/0115742 | A1* | 4/2017 | Xing | G06F 3/0485 |
| 2017/0249745 | A1* | 8/2017 | Fiala | A63F 13/65 |
| 2018/0095542 | A1* | 4/2018 | Mallinson | G06T 19/006 |
| 2018/0181199 | A1* | 6/2018 | Harvey | G06F 3/014 |
| 2018/0197336 | A1* | 7/2018 | Rochford | G06F 3/012 |
| 2019/0042834 | A1* | 2/2019 | Gavino | G06V 10/764 |
| 2019/0303088 | A1* | 10/2019 | Yuan | G06F 3/0482 |
| 2019/0346917 | A1* | 11/2019 | Yang | H04N 13/344 |
| 2020/0288202 | A1* | 9/2020 | Ohata | H04N 21/4302 |
| 2021/0056720 | A1* | 2/2021 | Uchida | G06T 7/73 |
| 2021/0281802 | A1* | 9/2021 | Kirisken | G02B 27/017 |
| 2022/0107774 | A1* | 4/2022 | Gehler | G06F 21/32 |
| 2022/0207869 | A1* | 6/2022 | Goodrich | G06V 20/20 |
| 2022/0254120 | A1* | 8/2022 | Berliner | G09G 5/10 |
| 2022/0337780 | A1* | 10/2022 | Huang | G06V 40/15 |
| 2022/0343534 | A1* | 10/2022 | Aleem | G06V 40/165 |
| 2023/0131474 | A1* | 4/2023 | Pecota | G06F 3/04842 |
| | | | | 701/21 |

* cited by examiner

METHOD AND APPARATUS FOR USING PHYSICAL DEVICES IN EXTENDED REALITY ENVIRONMENTS

FIELD OF THE DISCLOSURE

The present disclosure generally relates to virtual reality, augmented reality, mixed reality, and other extended reality environments provisioned with display devices of an information handling system by, for example, a head mounted display device. The present disclosure more specifically relates to the implementation of images presented on a video display device of an information handling system during use of the head mounted display device.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may be operatively coupled to a virtual or extended reality device such as a head mounted display (HMD) device that allows a user to view a simulated extended reality environment.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
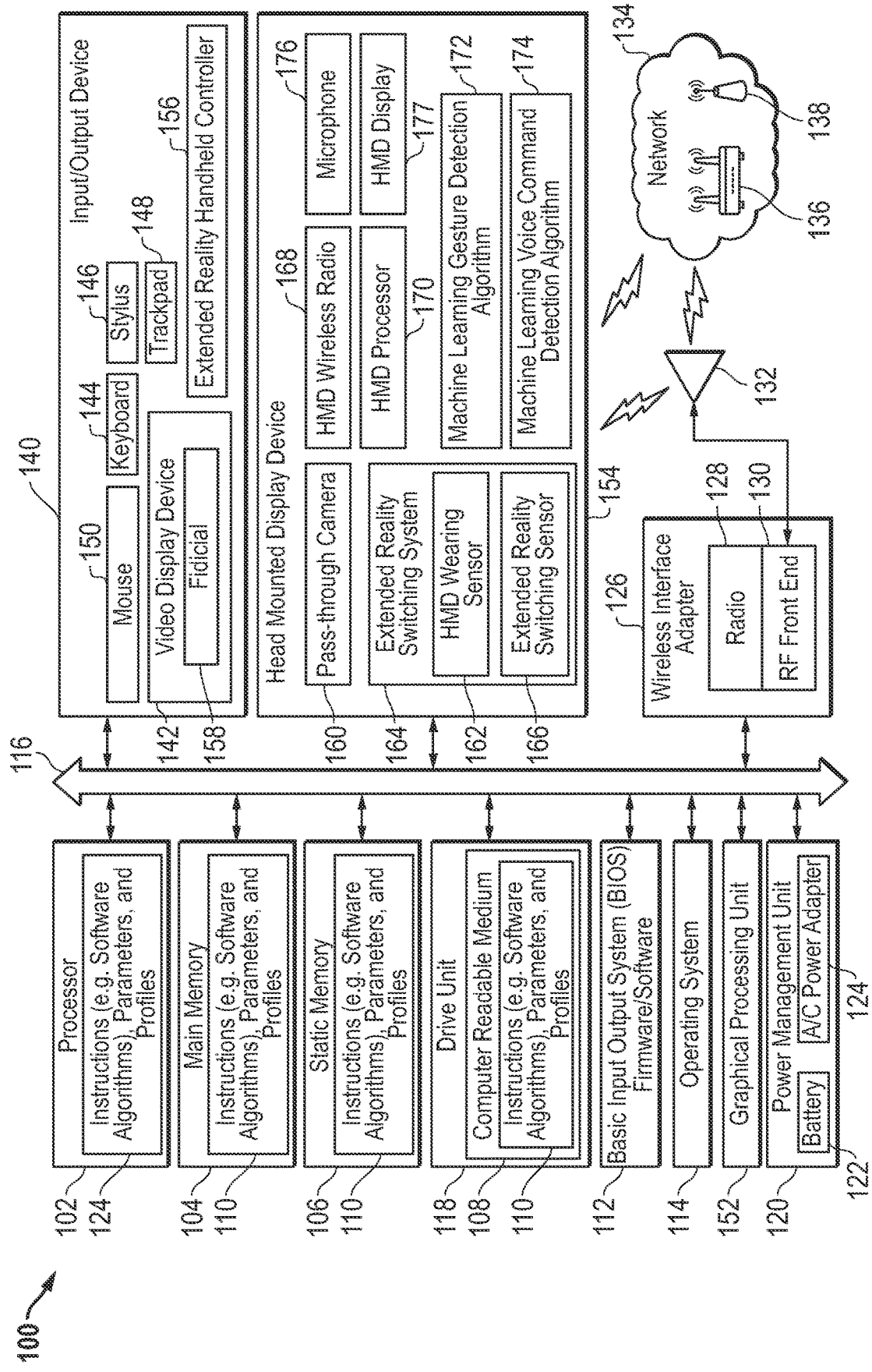
FIG. 1 is a block diagram illustrating an information handling system with an HMD device according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Head mounted display (HMD) devices may be wearable around the user's head and/or eyes and have the capability of providing displayed or projected images to a user. In an example, a user may be provided with a completely virtual reality (VR) environment while using the HMD device. In another example, the HMD devices may allow the user to see through those displayed or projected images in, for example, augmented reality (AR) or mixed reality (MR). Indeed, HMD devices may be capable of generating any type of extended reality (XR) environment such as AR, VR, MR, or any other type of XR environment provided by the HMD device and contemplated to exist along a reality-virtuality continuum.

HMD devices may be used for a variety of tasks and purposes. For example, HMD devices may be used to engage in video games, videoconferences, distance learning, virtual manufacturing, immersive training and simulation, three-dimensional (3D) visualization and review, guided or remote assist applications, and other tasks or processes that can be done virtually. These tasks and processes may be accomplished, according to the present disclosure, with the use of physical devices in the XR, (e.g., AR, VR, or MR) environments. In an example embodiment, a video display device may be used by the HMD device to present to a user an XR image versions of the graphical user interfaces (GUIs), windows, or other content that would be presented to the user via the video display device of an operatively coupled information handling system.

The present specification describes an information handling system operatively coupled to the HMD device, where the information handling system includes a processor, a memory, and a power management unit (PMU). The information handling system also includes a video display device (e.g., a computer monitor or other display device) to display, at one time, images, windows, and GUIs or other content associated with the execution of one or more applications, and, at another time, a fiducial image when an HMD device is detected as worn by a user. As described herein, the fiducial image may be used by the HMD device to recognize the presence and location of the video display device in order to reproduce, at least, the location of the video display device in an XR environment (e.g., VR, MR, AR). The information handling system may be operatively coupled to the HMD device such as via a wired or wireless connection using RF radios within the information handling system and the HMD device. In an embodiment, the HMD device may include an HMD display device in the HMD device to present to a user an XR image of a surrounding XR environment; a pass-through camera to detect the fiducial image displayed by the video display device, and a processor to receive data from an HMD wearing sensor descriptive of a user wearing the HMD device. The HMD device may further execute computer readable program code to display an XR environment to the user including an XR image version of the contents of the video display images to be presented to the user via the video display device by executing software applications. As the HMD device detects the use of the HMD device by a user and detects the fiducial image on the video display device of the information handling system, the user may be presented with an XR environment (e.g., VR, MR, AR) including one or more XR image versions of display content located relative to the fiducial image of a corresponding display device. The HMD device may detect plural fiducial images of plural video displays and provision XR image versions of display content according to those corresponding fiducial images in some embodiments. Placement and location of the XR image versions of video display device content may be placed in an XR environment relative to these one or more fiducial images on the physical display screens which may act as location beacons for the HMD device within the physical environment. For example, as the HMD device detects the fiducial image, a VR environment may be presented to the user that replicates the images, GUIs, and windows presented to the user via the video display device prior to the use of the HMD device. This allows a user to interface with the video display device while also wearing the HMD device.

While the user is operating the HMD device, with the option to change the type of XR environment from a first type of XR to a second type of XR. In an example embodiment, the user may provide XR switching input at any time to switch from, for example the VR environment to a pass-through AR or MR environment. This pass-through AR or MR environment may allow a user to view other physical devices such as a keyboard, a stylus, a mouse, the video display device or devices, or an HMD handheld controller, access, physically, one or more of those devices in order to interact with the XR environment including XR image versions of video display device content displayed to the user via the display device of the HMD device. Interaction with XR image versions of video display device content may also be tracked for later updated display on the correct video display device or location on the video display device, according to an embodiment. The XR switching input may include a voice command, a button actuation (e.g., a button on the HMD device or on the keyboard), a gesture, and the like in order to switch from the first type of XR to the second type of XR.

In an embodiment, the when the user removes the HMD device from the user's head, the HMD wearing sensor used to detect the use of the HMD device by the user may also be used to detect the removal of the HMD device. When the removal of the HMD device is detected, the images presented to the user via the HMD device may be returned and displayed once again at the video display device of the information handling system in a two-dimensional image replacing the fiducial images presented on the video display device described herein. As described herein, these images may include application GUIs in the form of windows. When the HMD wearing sensor detects that the HMD device has been removed, those windows represented to the user and manipulated by the user in the XR environment are reproduced on the video display device as updated versions of content and with updated location changes if any. An XR application program interface (API) may coordinate interaction and updates as well as switching between video display image content displayed on an information handling system video display device when no HMD device is being used and XR image versions of the same when the HMD device is being used. In this way, the XR switching system of embodiments here provides a seamless switching between the XR environment and the displayed images of a video display device in a physical environment for software application and the user using them.

FIG. 1 illustrates an information handling system 100 similar to information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a convertible laptop, a tablet, a smartphone, a desktop computer, a communications device, an access point (AP), a base station transceiver, a wireless telephone, a land-line telephone, a control system, a camera, a scanner, a printer, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the computer system 100 can be implemented using electronic devices that provide voice, video, or data communication. For example, an information handling system 100 may be any mobile or other computing device capable of executing a set of instructions (sequential or otherwise) that specify actions to be taken by that machine. In an embodiment, the information handling system 100 may be operatively coupled to a server or other network device as well as with an HMD device 154 and provide data storage resources, processing resources, and/or communication resources to the HMD device 154 as described herein. Further, while a single information handling system 100 is illustrated, the term "system" shall also be taken to include any collection of systems or sub-systems that individually or jointly execute a set, or multiple sets, of instructions to perform one or more computer functions.

The information handling system 100 may include memory (volatile (e.g., random-access memory, etc.), non-volatile (read-only memory, flash memory etc.) or any combination thereof), one or more processing resources, such as a central processing unit (CPU), a graphics processing unit (GPU), processing, hardware, controller, or any combination thereof. Additional components of the information handling system 100 can include one or more storage devices, one or more communications ports for communicating with external devices, as well as various input and output (I/O) devices 140, such as a keyboard 144, a mouse 150, a video display device 142, a stylus 146, a trackpad 148, and a XR handheld controller 156, or any combination thereof. The information handling system 100 can also include one or more buses 116 operable to transmit data communications between the various hardware components described herein. Portions of an information handling system 100 may themselves be considered information handling systems and some or all of which may be wireless.

Information handling system 100 can include devices or modules that embody one or more of the devices or execute instructions for the one or more systems and modules described above, and operates to perform one or more of the methods described above. The information handling system 100 may execute code instructions 110 via processing resources that may operate on servers or systems, remote data centers, or on-box in individual client information handling systems according to various embodiments herein. In some embodiments, it is understood any or all portions of code instructions 110 may operate on a plurality of information handling systems 100.

The information handling system 100 may include processing resources such as a processor 102 such as a central processing unit (CPU), accelerated processing unit (APU), a neural processing unit (NPU), a vision processing unit (VPU), an embedded controller (EC), a digital signal processor (DSP), a GPU 152, a microcontroller, or any other type of processing device that executes code instructions to perform the processes described herein. Any of the processing resources may operate to execute code that is either firmware or software code. Moreover, the information handling system 100 can include memory such as main memory 104, static memory 106, computer readable medium 108 storing instructions 110 of, in an example embodiment, a machine learning gesture detection algorithm 172 or a machine learning voice command detection algorithm 174, and drive unit 118 (volatile (e.g., random-access memory, etc.), nonvolatile (read-only memory, flash memory etc.) or any combination thereof).

As shown, the information handling system 100 may further include a video display device 142. The video display device 142, in an embodiment, may function as a liquid crystal display (LCD), an organic light emitting diode (OLED), a flat panel display, or a solid-state display. Although FIG. 1 shows a single video display device 142, the present specification contemplates that multiple video display devices 142 may be used with the information handling system to facilitate an extended desktop scenario, for example. Additionally, the information handling system 100 may include one or more input/output devices 140 including an alpha numeric input device such as a keyboard 144 and/or a cursor control device, such as a mouse 150, touchpad/trackpad 148, a stylus 146, a XR handheld controller 156, or a gesture or touch screen input device associated with the video display device 142. In an embodiment, the video display device 142 may provide output to a user that includes, for example, multiple windows describing multiple instances of applications being executed by the processor 102 of the information handling system. In this example embodiment, a window may be presented to the user that provides a GUI representing the execution of a word processing application, a GUI representing the execution of a spreadsheet application, a GUI representing the execution of a computer-aided design application, a GUI representing the execution of a gaming application, a GUI representing the execution of an email application, and a GUI representing the execution of a web browsing application, an image generation application such as content presentation software, or a drawing program, among others. These various windows may be stacked on top of each other so that the user may select among tabs or other window selection device to access the different windows. Each of these windows are represented on the video display device 142 in a two-dimensional view when the HMD device 154 is not being used by the user and may be referred to herein as video display images or video display content for information handling system 100. In an embodiment, the information handling system 100 may be local to the user who may operate the HMD device 154. The information handling system 100 and/or HMD device 154 are operatively coupled to one another and optionally coupled to a network 134 via a wireless interface adapter 126 or a wireless interface adapter within the HMD device 154, respectively. In an embodiment, the HMD device 154 and XR handheld controller 156 may be operatively coupled to one another and, optionally, to the information handling system 100 either via a wired or wireless connection such as Bluetooth or other protocol as described herein.

The network interface device of the information handling system 100 shown as wireless interface adapter 126 can provide connectivity among devices such as with Bluetooth or to a network 134, e.g., a wide area network (WAN), a local area network (LAN), wireless local area network (WLAN), a wireless personal area network (WPAN), a wireless wide area network (WWAN), or other network. In an embodiment, the WAN, WWAN, LAN, and WLAN may each include an access point 136 or base station 138 used to operatively couple the information handling system 100 to a network 134. In a specific embodiment, the network 134 may include macro-cellular connections via one or more base stations 138 or a wireless access point 136 (e.g., Wi-Fi or WiGig), or such as through licensed or unlicensed WWAN small cell base stations 138. Connectivity may be via wired or wireless connection. For example, wireless network access points 136 or base stations 138 may be operatively connected to the information handling system 100 and, in an embodiment, the HMD device 154. Wireless interface adapter 126 may include one or more radio frequency (RF) subsystems (e.g., radio 128) with transmitter/receiver circuitry, modem circuitry, one or more antenna front end circuits 130, one or more wireless controller circuits, amplifiers, antennas 132 and other circuitry of the radio 128 such as one or more antenna ports used for wireless communications via multiple radio access technologies (RATs). The radio 128 may communicate with one or more wireless technology protocols. In and embodiment, the radio 128 may contain individual subscriber identity module (SIM) profiles for each technology service provider and their available protocols for any operating subscriber-based radio access technologies such as cellular LTE communications.

In an example embodiment, the wireless interface adapter 126, radio 128, and antenna 132 may provide connectivity to a one or more of the peripheral devices that may include a wireless video display device 142, a wireless keyboard 144, a wireless mouse 150, a wireless headset such as the HMD device 154, a microphone 176, an audio headset, a wireless stylus 146, and a wireless trackpad 148, among other wireless peripheral devices used as input/output (I/O) devices 140 including any XR handheld controller 156 associated with the HMD device 154. In an embodiment, the HMD device 154 may include a wireless radio and an antenna to wirelessly couple the HMD device 154 to the information handling system 100 via the antenna 132 and radio 128. In an embodiment, the HMD device 154 may operate with Bluetooth radio protocols. In other embodiments, the HMD device 154 may operate with Wi-Fi 802.11 radio protocol, 5G NR radio protocols, or other wireless protocols. In an embodiment, an antenna controller operatively coupled to an operating system (OS) 114 may concurrently transceive data to and from various wireless devices such as the HMD device 154 or network 134 while a processing device of the HMD device 154 executes an XR switching system 164 in order to execute computer readable program code to switch from operating with no HMD device 154 being used to operate with an HMD device being used with an XR environment as well as switching between a first type of XR and a second type of XR upon detection of XR switching input. In an embodiment, the processing device that executes the XR switching system 164, machine learning gesture detection algorithm 172, or machine learning voice command detection algorithm 174 may be a processing device on the information handling system 100, at the HMD device 154, or a combination of processors on these devices. In one embodiment, the HMD device 154 may be operatively coupled to the information handling system 100 via a wired connection to a bus 116.

The XR handheld controller 156 may be a peripheral input/output device 140 used by the user to interact with virtual images presented to the user via the HMD device 154. In an embodiment, the XR handheld controller 156 may be operatively coupled to the information handling system 100 via a wireless connection using the wireless interface adapter 126 operatively coupled to the bus 116. In this embodiment, input signals from the XR handheld controller 156 may be relayed to the processor 102 or other processing device and used as input to manipulate an XR image presented to the user at the HMD device 154. In an embodiment, the XR handheld controller 156 may be operatively coupled to the bus 116 via a wired connection and receive this input as described. In another embodiment, the XR handheld controller 156 may be operatively coupled to the HMD device 154 via a wireless connection via operation of the HMD wireless radio 168 communicating with the radio 128 of the information handling system 100. In an example embodiment, the XR handheld controller 156 may provide input to a processing device at the HMD device 154 to manipulate an XR image presented to the user at the HMD device 154. In another example embodiment, the XR handheld controller 156, being operatively coupled to the bus 116 or wireless interface adapter 126, may provide input to the processor 102 of the information handling system 100 to manipulate an XR image presented to the user at the HMD device 154. In one example embodiment, the GPU 152 of the information handling system 100 may be used to process and generate the graphics used to create the XR environment at the HMD device 154.

As described, the wireless interface adapter 126 may include any number of antennas 132 which may include any number of tunable antennas for use with the system and methods disclosed herein. Although FIG. 1 shows a single antenna 132, the present specification contemplates that the number of antennas 132 may include more or less of the number of individual antennas shown in FIG. 1. Additional antenna system modification circuitry (not shown) may also be included with the wireless interface adapter 126 to implement coexistence control measures via an antenna controller in various embodiments of the present disclosure.

In some aspects of the present disclosure, the wireless interface adapter 126 may operate two or more wireless links. In an embodiment, the wireless interface adapter 126 may operate a Bluetooth wireless link using a Bluetooth wireless protocol. In an embodiment, the Bluetooth wireless protocol may operate at frequencies between 2.402 to 2.48 GHz. Other Bluetooth operating frequencies are also contemplated in the presented description. In an embodiment, a Bluetooth wireless link may be used to wirelessly couple the input/output devices operatively and wirelessly 140 including the XR handheld controller 156, mouse 150, keyboard 144, stylus 146, trackpad 148, and/or video display device 142 to the bus 116 in order for these devices to operate wirelessly with the information handling system 100. In a further aspect, the wireless interface adapter 126 may operate the two or more wireless links with a single, shared communication frequency band such as with the 5G standard relating to unlicensed wireless spectrum for small cell 5G operation or for unlicensed Wi-Fi WLAN operation in an example aspect. For example, a 2.4 GHz/2.5 GHz or 5 GHz wireless communication frequency bands may be apportioned under the 5G standards for communication on either small cell WWAN wireless link operation or Wi-Fi WLAN operation. In some embodiments, the shared, wireless communication band may be transmitted through one or a plurality of antennas 132 may be capable of operating at a variety of frequency bands. In a specific embodiment described herein, the shared, wireless communication band may be transmitted through a plurality of antennas used to operate in an NxN MIMO array configuration where multiple antennas 132 are used to exploit multipath propagation which may be any variable N. For example, N may equal 2, 3, or 4 to be 2×2, 3×3, or 4×4 MIMO operation in some embodiments. Other communication frequency bands, channels, and transception arrangements are contemplated for use with the embodiments of the present disclosure as well and the present specification contemplates the use of a variety of communication frequency bands. As described herein, the HMD device 154 also includes an antenna system (e.g., HMD wireless radio 168) used to transceive data to and from the information handling system 100 using these wireless communication protocols described herein. Additionally, or alternatively, the HMD wireless radio 168 within the HMD device 154 may be used to communicate wirelessly with a remote server at the network 134 via an access point 136 or base station 138.

The wireless interface adapter 126 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, Bluetooth standards, or similar wireless standards may be used. Wireless interface adapter 126 may connect to any combination of macro-cellular wireless connections including 2G, 2.5G, 3G, 4G, 5G or the like from one or more service providers.

Utilization of radio frequency communication bands according to several example embodiments of the present disclosure may include bands used with the WLAN standards and WWAN carriers which may operate in both licensed and unlicensed spectrums. For example, both WLAN and WWAN may use the Unlicensed National Information Infrastructure (U-NII) band which typically operates in the ~5 MHz frequency band such as 802.11 a/h/j/n/ac/ax (e.g., center frequencies between 5.170-7.125 GHz). WLAN, for example, may operate at a 2.4 GHz band, 5 GHz band, and/or a 6 GHz band according to, for example, Wi-Fi, Wi-Fi 6, or Wi-Fi 6E standards. WWAN may operate in a number of bands, some of which are proprietary but may include a wireless communication frequency band. For example, low-band 5G may operate at frequencies similar to 4G standards at 600-850 MHz. Mid-band 5G may operate at frequencies between 2.5 and 3.7 GHz. Additionally, high-band 5G frequencies may operate at 25 to 39 GHz and even higher. In additional examples, WWAN carrier licensed bands may operate at the new radio frequency range 1 (NRFR1), NFRF2, bands, and other known bands. Each of these frequencies used to communicate over the network 134 may be based on the radio access network (RAN) standards that implement, for example, eNodeB or gNodeB hardware connected to mobile phone networks (e.g., cellular networks) used to communicate with the information handling system 100. In the example embodiment, the information handling system 100 may also include both unlicensed wireless RF communication capabilities as well as licensed wireless RF communication capabilities. For example, licensed wireless RF communication capabilities may be available via a subscriber carrier wireless service operating the cellular networks. With the licensed wireless RF communication capability, a WWAN RF front end (e.g., antenna front end 130 circuits) of the information handling system 100 may operate on a licensed WWAN wireless radio with authorization for subscriber access to a wireless service provider on a carrier licensed frequency band.

In other aspects, the information handling system 100 operating as a mobile information handling system may operate a plurality of wireless interface adapters 126 for concurrent radio operation in one or more wireless communication bands. The plurality of wireless interface adapters 126 may further share a wireless communication band or operate in nearby wireless communication bands in some embodiments. Further, harmonics and other effects may impact wireless link operation when a plurality of wireless links are operating concurrently as in some of the presently described embodiments.

The wireless interface adapter 126 can represent an add-in card, wireless network interface module that is integrated with a main board of the information handling system or integrated with another wireless network interface capability, or any combination thereof. In an embodiment the wireless interface adapter 126 or an HMD wireless radio 168 may include one or more radio frequency subsystems including transmitters and wireless controllers for connecting via a multitude of wireless links. In an example embodiment, an information handling system 100 may have an antenna system transmitter for Bluetooth, 5G small cell WWAN, or Wi-Fi WLAN connectivity and one or more additional antenna system transmitters for macro-cellular communication. The RF subsystems and radios 128 and for the HMD wireless radio 168 include wireless controllers to manage authentication, connectivity, communications, power levels for transmission, buffering, error correction, baseband processing, and other functions of the wireless interface adapter 126 and for the HMD wireless radio 168.

In an embodiment, the HMD device 154 may include its own XR software platform and applications. For example, the HMD device 154 may include a game engine such as Unity® developed by Unity Technologies or Unreal® developed by Epic Games that may be used to help design the XR software used to operate the HMD device 154. The HMD device 154 may also include standards such as Open XR® developed by Khronos Group that allows developers to build applications that may work across a variety of HIVID devices 320. Development kits such as Vuforia Nvidia Omniverse® developed by Nvidia GTC, ARCore® developed by Google, Qualcomm XR® developed by Qualcomm, may also be executed by the head-mounted display device 120 in order to provide for the development of AR applications and mark less tracking algorithms and computer code to be executed by the head-mounted display device 120. These kits and standards, among others, may be used to develop executable program code and provide content to the user at the HMD device 154. In an embodiment, the information handling system 100 may include one or more application programming interfaces (APIs) that allow the information handling system 100 to cause certain applications to be executed on the HMD device 154. These APIs may be associated with one or more sets of instructions (e.g., software algorithms), parameters, and profiles 110 that, during execution of an XR environment at the HMD device 154, causes these applications to be represented to the user within the XR environment. For example, a word processing application being executed by the processor 102 of the information handling system 100 may include an API that, when the HMD device 154 is being used by the user, allows that application to be executed at the HMD device 154 with the user being allowed to interact with the word processing application and maintain updates to changes made in the XR environment.

In an embodiment, the HMD device 154 may include its own wireless interface adapter, radio, antenna front end, and antenna such as the HMD wireless radio 168. This may allow the HMD device 154 to communicate with the information handling system 100 or, alternatively, directly to a network maintaining a remote server used to provide the XR environment to the user (e.g., software as a service, storage as a service, processing as a service). As such, this wireless interface adapter, radio, antenna front end, and antenna of the HMD wireless radio 168 may conserve processing resources of the HMD processor 170 and/or processor 102/GPU 152 of the HMD device 154 and information handling system 100 if necessary. With the wireless interface adapter, radio, antenna front end, and antenna of the HMD wireless radio 168 of the HMD device 154, the HMD device 154 may communicate with the information handling system 100 or the network 134 via an out-of-band (OOB) communication channel, for example. The OOB communication may initially facilitate the communication of the HMD device 154 with the information handling system 100 or some external sensors via, for example, Bluetooth or Wi-Fi communication protocols. In an embodiment, the OOB communication may also be accomplished using those wireless communication protocols described in connection with the operation of the wireless interface adapter 126. In an embodiment, this OOB communication may occur below the basic input/output system (BIOS) 112 or OS 114 allowing the communication to proceed in the background of other processes being executed by the processor 102 or other processing device such as the GPU 152. This allows the processing resources of the processor 102 or GPU 152 of the information handling system 100 or the processing devices of the HMD device 154 to be conserved for other processing tasks associated with the processing of XR images and data associated with the display of those images to the user via the display device of the HMD device 154.

During operation, the information handling system 100 may communicate with the HMD device 154 either via a wired connection or wirelessly as described herein. The operation of the HMD device 154 may not be dependent on the information handling system 100 being in operation, in an embodiment, and the HMD device 154 may be used by the user whether the information handling system 100 is operatively coupled to the HMD device 154 or not, in some embodiments.

In this embodiment, the HMD device 154 may include the necessary hardware used to, in an embodiment, display an XR image of a surrounding physical environment while tracking the location of the HMD device 154 (and the user) within the physical environment. This hardware used may vary depending on the type of process used to display the XR image to the user. Example processes may be grouped into two general categories: inside-out positional tracking processes and outside-in tracking processes. Although, the present specification contemplates the use of outside-in tracking processes, for convenience in description, the present specification describes an HMD device 154 the operates using an inside-out process of tracking the HMD device 154. With the inside-out process of tracking the HMD device 154, the HMD device 154 includes a pass-through camera 160 and other sensors used to determine the location of the HMD device 154 as it moves within an environment, in an embodiment. In an embodiment, the HMD device 154 may include positional sensors such as a global positioning system (GPS) unit, an inertial measurement unit (IMU), an e-Compass unit, and/or other positional measurement tools such as an accelerometer, a capacitive transducer, a hall effect sensor, a laser doppler vibrometer, a multi-axis displacement transducer, a potentiometer, or a confocal chromatic sensor. Other positional sensors are also contemplated, including a capacitive displacement sensor, an eddy-current sensor, an ultrasonic sensor, a grating sensor, an inductive non-contact position sensor, a linear variable differential transformer, a photodiode array, a piezo-electric transducer, a proximity sensor, a rotary encoder, a seismic displacement pick-up, and a string potentiometer, along with any other positional sensors developed in the future. The positional sensors (e.g., GPS unit, IMU, and/or eCompass unit) in an embodiment may operate to measure location coordinates (x, y, z) of the HMD device 154, as well as orientation (θ), velocity, and/or acceleration. Velocity, acceleration, and trajectory of the HMD device 154 in such an embodiment may be determined by comparing a plurality of measured location coordinates and orientations taken over a known period of time, or may be measured directly by onboard positional sensor such as an accelerometer. Additionally, or alternatively, Wi-Fi triangulation or other wireless multi-laterateration methods may be used that uses the characteristics of nearby Wi-Fi hotspots and other wireless access points 136 or base stations 138/nodes to discover where within an environment the HMD device 154 is located. Additionally, or alternatively, an Internet-of-Things (IoT) device may be used that include sensors that may be detectable by the HMD device 154 and provides data to the HMD device 154 that it is within a physical environment.

In an embodiment, a simultaneous localization and mapping (SLAM) engine executing a SLAM process (described herein), the IoT devices, and the Wi-Fi hotspot triangulation process may all be used as data inputs to the head mounted display CPU/GPU or the processor 102 to better determine the initial configuration and location of the HMD device 154. In an embodiment, the OOB communication channel may help to communication wirelessly with some of these sensors when determining the location of the HMD device 154. In an embodiment, the HMD device 154 may include an embedded controller that operates this OOB communication link so that this communication may be conducted below the operating system of the HMD device 154. This prevents the HMD processor 170 (e.g., a processor, GPU, CPU, or other microcontroller, etc.) from having to receive and compute this data leaving the HMD processor 170 to conduct, for example, the SLAM computations described herein.

The HMD device 154 may also be capable of capturing video or still images of its surrounding environment, which may include one or more identifiable landmarks. For example, the HMD device 154 may include one or more cameras such as the pass-through camera 160. These cameras may capture two-dimensional images of the surrounding environment, which may be combined with distance measurements gathered by a plurality of, for example, IR emitters and detectors to generate a three-dimensional image of the surrounding environment. The cameras, in an embodiment, may be, for example, a stereo triangulation camera, an Infrared (IR) camera, a sheet of light triangulation camera, a structured light camera, a time-of-flight or time of arrival camera, an interferometry camera, a coded aperture camera, a RGB digital camera, an infrared digital camera, a telephoto lens digital camera, a fish-eye digital camera, a wide-angle digital camera, a close-focus digital camera, or any other type of camera. The three-dimensional image generated by a processing device (e.g., the HMD processor 170, GPU 152, or processor 102 and the like) in an embodiment may be used to determine the position and orientation of the HMD device 154 with respect to the one or more landmarks with respect to the physical surroundings as well as any virtual images in a projected XR setting on the HMD device 154.

In an embodiment, a processing device either on the HMD device 154 (e.g., HMD processor 170) itself or the processor 102 in operative communication with the HMD device 154 may process this received data from these sensors and the camera in order to facilitate the presentation of an XR image of a surrounding environment to a user via a display device on the HMD device 154 as described herein. This may be done using, for example a simultaneous localization and mapping (SLAM) process. The SLAM process, in an embodiment, may be employed in order to identify the position of the headset with respect to its surrounding environment, model the surrounding environment as viewed from the perspective of the headset wearer, and render the modeled image in a three-dimensional environment matching the surrounding real-world environment. The surrounding environment may be virtual or some combination of physical and virtual for XR. It does this by a processing device (e.g., processor 102 or the HMD processor 170 of the period HMD device 154) executing computer readable program code describing an algorithm that concurrently maps a surrounding XR environment the HMD device 154 is within and detects the position of the HMD device 154 within that surrounding XR environment. IR emitters and sensors housed within or mounted on the exterior surfaces of the HMD device 154 may measure such distances in an embodiment. IR emitters and sensors may be mounted in all directions around the exterior surface of the HMD device 154, in some embodiments. In other embodiments, only portions of the exterior surfaces of the wearable headsets may have infrared emitters and sensors or cameras. For example, the HMD device 154 may emit IR light in a pattern toward the physical landmark, the HMD device 154 may emit IR light, and/or the HMD device 154 may emit IR light toward the physical landmark. The cameras mounted to the HMD device 154 may then capture an image of each of the IR lights reflecting off the surfaces of the physical landmark. If the surrounding environment further includes other ambient light sources, the cameras will also detect illumination from the physical landmark reflecting such ambient light. For example, if desk lamp and/or floor lamp are turned on, the physical landmark in an embodiment may reflect ambient light generated by the lamps.

The depth of surfaces of nearby objects may be determined by analyzing the way in which the pattern of emitted IR light is distorted as it reaches surfaces of varying distances from the headset. For example, the HMD device 154 may determine the depth of the physical landmark by analyzing the way in which the pattern of emitted IR light is distorted as it reaches the surfaces of physical landmark. Similarly, the HMD device 154 may determine the depth of the physical landmark by analyzing the way in which the pattern of emitted IR light is distorted as it reaches the surfaces of physical landmark, and the HMD device 154 may determine the depth of the physical landmark by analyzing the way in which the pattern of emitted IR light is distorted as it reaches the surfaces of physical landmark. With this data and the other data from the other sensors described herein, the processing device may execute the algorithm defining the SLAM process in order to render to a user via the display device of the HMD device 154 an XR image based on a rendered image from the model generated and referenced movement within the surrounding XR environment based on movement of the HMD device 154 relative to physical landmarks.

During operation of the information handling system 100, the user may want to interact with the applications currently being executed on the video display device 142 by the information handling system 100 or may want to interact with the same video display device images and content via the HMD device 154. By using the HMD device 154, the user may be immersed within an XR environment while interacting with those applications and video display device content to be displayed on that video display device 142 as an XR image version displayed within the XR environment. In order to replicate those applications currently being executed on the desktop environment (e.g., in a two-dimensional environment), the HMD device 154 may first be initialized. The initialization process may include turning on the HMD device 154. When the HMD device 154 is powered on, a pairing process may be initiated using the OOB communications or other communications described herein in order to communicatively couple to the HMD device 154 to the information handling system 100. In an embodiment, this communication may further include any system or services information updates that may update software on the HMD device 154, for example. The XR switching system 164 may exchange data with a processor 102, GPU 152, embedded controller or other processor of the information handling system to execute some or all portions of the operations of the XR switching system 164. Further, some or any portion of the XR switching system 164 may execute on the processor 102, GPU 152, embedded controller or other processor of the information handling system 100 such that processing tasks for XR switching may be shared or the HMD processor 170 may be supported by the processing resources of the information handling system 100.

The initialization process may also include an XR switching system 164 on HMD device 154 or the processor 102 or other processing resource of the information handling system 100 to generate of fiducials or fiducial images 158 used by the HMD device 154 to track the location of the video display device 142 of the information handling system 100 in an XR environment and as described herein. The fiducial image 158 may be particular to and identify each video display device 142 and its relative location in the physical environment relative to the HMD device 154 such as when one or more display devices 142 are operatively coupled to the information handling system 100 in an embodiment. For example, in addition to the fiducial image 158 providing a marker describing where the video display device 142 is within a physical environment, the fiducial image 158 may also relay data descriptive of the characteristics of the video display device 142 provide for a location beacon for XR image versions of video display content and coordinate XR interactions with the video display content from that video display device and the software application running on the information handling system 100. In this example embodiment, the fiducial image 158 may be a quick response (QR) code that includes within its matrix metadata describing the identification of the video display device 142, the physical size of the video display device 142, the resolution of the video display device 142, and the refresh rate of the video display device 142, location relative to a multiple-display desktop, among other data. In an embodiment, the fiducial image 158 may be generated and stored by the information handling system 100 for later use in the processes described herein.

In an embodiment, the HMD device 154 may include an HMD wearing sensor 162. The HMD wearing sensor 162 may be any type of sensor that detects when the HMD device 154 is being worn by the user and when the HMD device 154 is not being worn by the user. According to the methods and systems described herein, as the user wears the HMD device 154, the XR switching system 164 causes the XR environment that is displayed to the user to include a replication of, at least, the images, windows, and applications that would be presented to the user via the video display device 142. The XR switching system 164 may execute via an HMD processor 170 to detect the user wearing or not wearing the HMD device 154 via the HMD wearing sensor 162. Upon doing so, the HMD processor 170 may transmit wearing indication data via an HMD interface with the information handling system 100 to the processing resources such as processor 102 or XR switching system 164 counterpart on the information handling system 100 to trigger generation of fiducial images and to trigger an application programming interface (API) for conversion of video display device application images to XR image versions for display via the HMD device 154. The HMD interface with the information handling system may be wired or may be wireless via the HMD wireless radio 168, for example via a Bluetooth wireless link, and the wireless interface adapter 126. In order to determine when to replicate this data within the XR environment, the HMD device 154 executing the XR switching system 164 may receive wearing indication data from the HMD wearing sensor 162 indicating when the user has donned or removed the HMD device 154 and transmit the same via the HMD interface to the information handling system 100. In an embodiment, the HMD wearing sensor 162 may include an eye tracking system that tracks the user's eyes via an internal camera. In this example embodiment, when the eye tracking system detects the presence of the user's eyes, the images, windows, and applications originally presented to the user on the video display device 142 may be replicated within the XR environment at the HMD device 154. Accordingly, when the eye tracking system does not detect the presence of the user's eyes, the replication of the images, windows, and applications may end and those applications may be displayed on the video display device 142 again. The HMD wearing sensor 162, therefore, may continuously detect whether the user is wearing the HMD device 154 or not and replicate those images, windows, and applications accordingly. It is appreciated that the HMD wearing sensor 162 may include any other type of sensor such as an accelerometer, a contact switch placed within the HMD device 154, a light sensor, pressure sensors such as a micro-electric machine (MEMS) device, a capacitive sensor, a resistive sensor, and/or a Hall effect sensor, among other user-detection methods, systems, and devices.

Because the HMD device 154 and information handling system 100 are in communication with each other (e.g., wired or wirelessly), as the HMD wearing sensor 162 detects the presence of the user, the XR switching system 164 may receive a communication of wearing sensor data sent to the information handling system 100 such that the fiducial image 158 generated during the initialization of the HMD device 154 may be displayed on the video display device 142. In an embodiment, the display of the fiducial image 158 on the video display device 142 such as via the GPU 152 may result from the processor 102 or GPU 152 of the information handling system 100 receiving a signal from the HMD wearing sensor 162 of the HMD device 154 (e.g., via OOB communication) that the HMD device 154 is currently being worn by the user. At this point, the information handling system 100 may send a signal to the HMD device 154 that the fiducial image 158 is being displayed on the video display device 142 and that the HMD device 154 can now activate the pass-through camera 160 in order to detect that fiducial image 158. Upon recognition of the fiducial image 158, the HMD device 154 may display an XR environment depicting a virtual image of, at least, the images, applications, and windows previously displayed on the video display device 142 and relative to a location of the corresponding video display device 142. Relative XR image version locations displayed on the HMD device 154 may be located near the detected fiducial image 158 as a location beacon or, in some embodiments, may be moved to a different desired location for use or interaction depending on the software application or the XR environment simulation requirements but the location in the XR environment tracked relative to the fiducial image 158 and its location in the physical environment relative to the HMD device 154.

It is appreciated that the XR environment that is presented to the user may, in an example embodiment, include a VR environment that fully immerses the user within a virtual environment. Again, in this VR environment, the user may see a virtual reproduction of the video display device 142 or some other XR image placed in any location of the XR environment based on the fiducial image location in the physical real-world. Along with this virtual representation based on the location of the fiducial 158 on the video display device 142, the images, applications, and windows previously presented on the video display device 142 may now be virtually recreated in the VR environment and XR image locations via execution of the APIs used by the information handling system 100 to present the executed applications and windows in an XR environment. These APIs may be particular to each of the executed applications and windows and may be presented to the user in a similar look as that originally presented by the information handling system 100 via the video display device 142 or modified as the user desires. When engaged in the VR environment, the user may access an input device such as the XR handheld controller 156 and manipulate the windows or images presenting the applications such that, in the VR environment, the windows may be placed outside the boundaries of a virtually represented video display device or location and effectively extending the desktop and workspace for the user. In an embodiment, the user may virtually move the reproduced windows revealing a desktop of the virtual video display device revealing any icons or shortcuts to the user. The XR switching system 164 allows the user to access other functionalities of the information handling system 100 similar to those that would have been made available to the user via the video display device 142 when the user is not wearing the HMD device 154. The APIs implemented via the XR switching system 164 may communicate with executing software applications to track and apply changes or instructions to the XR image version or other XR images for when the HMD device 154 is not being used and a two-dimensional (2D) representation on the video display devices 142 will return. It is appreciated that, in an embodiment, the XR environment presented to the user initially upon wearing the HMD device 154 may be any type of XR (e.g., VR, MR, AR). In an embodiment, the XR environment presented to the user initially upon wearing the HMD device 154 may be defaulted to a VR environment.

The HMD device 154 may further include the XR switching system 164 to switch among types of XR environments as well as to switch between any XR environment and the physical would display of content on 2D video display devices 142. In an embodiment, the XR switching system 164 may, via an HMD processing device 170 on the HMD device 154 or via a processing resource such as processor 102 in the information handling system, execute computer readable program code to switch from a first type of XR to a second type of XR upon detection of XR switching input. Coordination of the XR switching via the XR switching system may include exchange of XR switching input data via an HMD interface that is wired or wireless between the HMD device 154 and the information handling system 100. Thus, the XR switching system may operate on either or both of the HMD device 154 and the information handling system 100. Aspects of determining a XR switching input to switch between a first XR type and a second XR type may be detected and processed by an XR switching sensor 166 such as a mechanical, electrical, capacitive switch on the HMD device or via a machine learning gesture detection algorithm 172 or a machine learning voice command detection algorithm 174. Some or all of the processing of the XR switching input detection or interpretation as well as any execution of code instructions to change between a first type of XR and a second type of XR may occur on either the HMD device 154 or the information handling system 100 or some combination. XR switching input data may be exchanged between the HMD device 154 and the information handling system 100. As described herein, the HMD device 154 may be capable of generating and presenting to a user any type of XR images including AR, VR, and MR, or any other type of XR provided by the HMD device and contemplated to exist along a reality-virtuality continuum. In an embodiment, a user may cause the XR switching system 164 to switch from a first type of XR to a second type of XR by providing XR switching input to the HMD device 154. In an embodiment, this XR switching input may include a detection of an actuation of a button or switch formed on the HMD device 154 that a user may activate to cause the XR switching input to be sent to the XR switching system 164 on either the HMD device 154 or the information handling system 100 via XR switching input data exchange. This causes the XR switching system 164 to switch from the first type of XR to the second type of XR. This analog input from the user may allow a user to toggle between, for example, AR, VR, or MR based on the position of the switch or the number times the user actuates the switch. In an embodiment, this switch may be located on the XR handheld controller 156 or may be presented virtually (e.g., an icon presented visually to a user) to the user via a display device on the HMD device 154 and actionable via use of the XR handheld controller 156 within the surrounding XR environment.

In another embodiment, the XR switching system 164 may implement a gesture detection process via execution of a machine learning gesture detection algorithm 172 by a processor (e.g., processor 102, GPU 152, HMD processor 170) to determine whether a user is intending to switch from a first type of XR to a second type of XR. Any portion or all of the machine learning gesture detection algorithm 172 may be executed on the HMD device 154 or the information handling system 100 or some combination. The gesture detection process may include detecting a gesture by a user via the pass-through camera 160 and determining whether that gesture is a triggering gesture (e.g., used as XR switching input) within the surrounding XR environment used to switch from the first type of XR to the second type of XR. For example, a user may present, in front of the pass-through camera 160 of the HMD device 154 a predetermine hand gesture and, in an example embodiment, the XR switching system 164 may execute or have executed the machine learning gesture detection algorithm 172 used to detect a gesture of a user and provide output indicating whether the detected gesture is or is not the triggering gesture. In this embodiment, the operation of the pass-through camera 160 or other sensing device may detect a user's gesture by detecting movement of the user's body parts such as, in an example, the user's hand in the physical world around the HMD device 154. The pass-through camera 160 and other sensors may be used to detect the vector movements of the user's hand and processes those signals using machine learning techniques that can classify those gestures (e.g., machine learning gesture detection algorithm 172). In an embodiment, the detected gesture movements of a user's hand may be related to the surrounding XR environment.

During operation and after the camera such as pass-through camera 160 has detected movement by the user, detected tagged telemetry data may be provided to a machine learning gesture detection algorithm 172 as input. In an embodiment, the machine learning gesture detection algorithm 172 may classify this detected movement of the user to determine if a predetermined triggering gesture is being presented by the user. Where the machine learning gesture detection algorithm 172 determines that a triggering gesture has been detected, the output may be presented to the processor executing the XR switching system 164. In an embodiment, the machine learning gesture detection algorithm 172 may be executed at the information handling system 100 at a processor 102 and by the OS 114, in some embodiments, in whole or in part remotely on a server that includes computing resources, and/or via a processing device on the HMD device 154.

In one example embodiment, the machine learning gesture detection algorithm 172 may be remote from the information handling system 100 to be trained remotely. In an embodiment, the machine learning gesture detection algorithm 172 operating at the processor 102 and OS 114 (and/or an HMD processor 170) on the information handling system 100 may be a trained module sent to the information handling system 100 from these remote processing service after the machine learning gesture detection algorithm had been trained. During operation and when the trained machine learning gesture detection algorithm 172 provides output indicating that a triggering gesture has been detected, this gesture data may be provided to the processor 102 for the processor 102 to execute a switching from a first type of XR to a second type of XR.

Additionally, or alternatively, the XR switching system 164 may implement a voice command detection process via execution of a machine learning voice command detection algorithm 174 for voice and language recognition by a processor (e.g., processor 102, GPU 152, HMD processor 170) to determine whether a user is intending to switch from a first type of XR to a second type of XR. Any portion or all of the voice command detection algorithm 174 for voice or language recognition may be executed on the HMD device 154 or the information handling system 100 or some combination. The voice command detection process may include detecting a voice command from user via, for example, a microphone 176 and determining whether that voice command is a triggering voice command (e.g., used as XR switching input) within the surrounding XR environment used to switch from the first type of XR to the second type of XR. For example, a user may speak a predetermine voice command (e.g., "switch to augmented reality") and, in an example embodiment, the XR switching system 164 may execute or have executed the machine learning voice command detection algorithm 174 used to detect and recognize with natural language recognition or other techniques a voice command of a user and provide output indicating whether the detected voice command is or is not the triggering voice command. It is appreciated that, like the execution of the machine learning gesture detection algorithm 172, the execution of the machine learning voice command detection algorithm 174 may be based on the microphone 176 detecting the voice of the user (e.g., similar to a gesture detected by the pass-through camera 160). In this embodiment, the operation of the microphone 176 or other voice sensing device may detect a user's voice command by detecting changes in decibel levels around the HMD device 154. The microphone 176 and other sensors may be used to detect the voice command and processes those signals using machine learning techniques that can classify those voice commands (e.g., machine learning voice command detection algorithm 174).

After the microphone 176 has detected a voice command from the user, detected voice data may be provided to a machine learning voice command detection algorithm 174 as input. In an embodiment, the machine learning voice command detection algorithm 174 may classify this detected voice command from the user to determine if a predetermined triggering voice command is being presented by the user. Where the machine learning voice command detection algorithm 174 determines that a triggering voice command has been detected, the output may be presented to the processor executing the XR switching system 164. In an embodiment, the machine learning voice command detection algorithm 174 may be executed at the information handling system 100 at a processor 102 and by the OS 114, in some embodiments, in whole or in part remotely on a server that includes computing resources, and/or via a processing device on the HMD device 154.

In one example embodiment, the machine learning voice command detection algorithm 174 may be remote from the information handling system 100 to be trained remotely. In an embodiment, the machine learning voice command detection algorithm 174 operating at the processor 102 and OS 114 (and/or an HMD processor 170) on the information handling system 100 may be a trained module sent to the information handling system 100 from these remote processing service after the machine learning voice command detection algorithm 174 had been trained. During operation and when the trained machine learning voice command detection algorithm 174 provides output indicating that a triggering voice command has been detected, this voice data may be provided to the processor 102 for the processor 102 to execute a switching from a first type of XR to a second type of XR.

In another embodiment, the switching conducted by the XR switching system 164 may be done via any other XR switching sensor 166. These other XR switching sensors 166 may include analog or virtual buttons or switches the user may access to select a specific XR environment (e.g., VR, MR, AR) that receives input for the XR switching system 164 where the XR switching system 164 may switch from the first type of XR to a second type of XR.

As a result of the execution of these methods and hardware, the user may, at any time, change from a first type of XR to a second type of XR. For example, where the HMD device 154 has presented a VR environment to the user as described herein after donning the HMD device 154, the user may provide the XR switching input as described herein either by actuating a button, actuating a virtual button, providing a gesture, or providing a voice command, among other types of input. The provision of the XR switching input to place the information handling system 100 in either an AR or MR environment allows a user to view real-world images augmented or overlayed by the virtual images, applications, and/or windows. As such when the AR or MR environments are presented a user may be capable of accessing a keyboard 144, a stylus 146, a mouse 150, a trackpad 148, and the XR handheld controller 156 in order to provide input at the images, applications, and windows presented to the user virtually. In this embodiment, the pass-through camera 160 may be used to provide the real-world images of the surrounding physical environment as well as monitor for the gesture XR switching input as described herein.

The XR switching system 164 may provide a user with capability of switching between any XR environment and software application operating via 2D images on a video display device 142 or dynamically switching from viewing a VR environment, a MR environment, or an AR environment to one of the different environments. VR environments, generally, include the HMD device 154 providing a complete environment of a different environment to the user even though that environment presented to the user may resemble real-world environments or may be unique, but positioning may be relative to real-world location and location beacons including the fiducial images 158. With VR environments, therefore, a complete virtual image is presented to the user via the display device of the HMD device 154 and may provide no real-world images to the user concurrently. In this embodiment, the VR environment includes a representation of the images, windows, and applications associated with the images, windows, and applications presented to the user via the video display device 142 when the HMD device 154 is not being worn by the user. With AR environments, the environment may include images of objects that reside in the real world with computer-generated perceptual information enhancing those images such as the reproduction of the images, applications, and windows presented to the user via the video display device 142 prior to the user wearing the HMD device 154. In an embodiment, this computer-generated perceptual information may also include multiple sensory modalities such as visual, auditory, haptic, somatosensory and even olfactory modalities. As described herein, one additional computer-generated perceptual information includes the provisioning of a virtual switch or button used by a user to, when virtually actuated using an input device, provides a signal to the XR switching system 164 for the XR switching system 164 to switch from the first type of XR (e.g., VR, MR, AR) to a second type of XR. The AR environment may, therefore, include a projection of a real-world environment with information or objects added virtually as an overlay. MR environments may include a merging of real-world images captured by the camera and virtual, computer-generated images that are presented to the user. In an embodiment, unlike in AR, the user interacting in an MR environment may interact with the digital objects presented to the user. As such, it may be helpful to be able to dynamically switch from a first of these XR types to another XR type when operating the HMD device 154 in various environments. The HMD device 154 allows this to occur via operation of the XR switching system 164.

By way of example, the HMD device 154 of the present specification may be used by an office worker executing on an information handling system 100, for example, an email application, a word processing application, and a computer-aided design (CAD) application. The execution of each of these applications may have a window associated with these applications that would be presented to the user via the video display device 142 if no HMD device 154 were being used. The HMD device 154 may facilitate, for example, the work production of the office worker by providing an XR environment from which the user may interact with the execution of these applications. As the user powers up the HMD device 154, the initialization process may begin with the communicative coupling of the HMD device 154 to the information handling system 100 and the XR switching system 164 may initiate the generation of the fiducial image 158 as described herein. A SLAM process described herein may also be initiated that maps the physical environment and prepares a digital image of the physical world to be seen by the user. The user may then wear the HMD device 154 and the information handling system 100, once prompted to do so from a signal from the HMD wearing sensor 162, the XR switching system 164 may communicate with the information handling system 100 to present the fiducial image 158 on the video display device 142.

Additionally, when the user wears the HMD device 154, the HMD wearing sensor 162 may also cause the XR switching system 164 to send a signal to the HMD device 154 to cause the pass-through camera 160 to detect the image of the fiducial image 158 presented on the video display device 142. Once the image of the fiducial image 158 is acquired, the HMD device 154 may, initially, provide a VR environment to the user via the display device of the HMD device 154. Again, the XR switching system 164 initiates APIs so this VR environment replicates the windows associated with the email application, the word processing application, and the CAD application being executed by the information handling system 100 as XR image versions and locates them based on the fiducial images 158 detected. In an embodiment, the windows associated with each of these executed applications may be moved by the user within the VR environment or otherwise interacted with, in an example embodiment, as a virtually replicated image of the desktop.

The methods of interacting with the various windows of the executed applications may also vary depending on the type of application being executed and the APIs associated with the execution of those applications via the HMD device 154. For example, where the user wishes to interact with the word processing application being executed, the user may provide a gesture, voice command, actuate a button or icon, or otherwise provide the XR switching input to the HMD device 154 as described herein. Upon receipt of this XR switching input, the HMD device 154 may execute one of the machine learning gesture detection algorithm 172, the machine learning voice command detection algorithm 174, or other processes to affect the switching from a first type of XR (e.g., VR) to a second type of XR (e.g., AR or MR). Because the user may want to interact with the word processing application using a keyboard 144 or a mouse 150, the user may cause the HMD device 154 to present one of an AR or MR environment so that the pass-through camera 160 may present the real-world image of the user's desk in order to permit the user to physically access some of these input devices. Such a process may, for example, be conducted for the user to access the keyboard 144 and mouse 150 in order to provide a user the ability to see the input/output devices 140 and interact with the word processing or email application being executed.

The user may also be provided with three-dimensional images related to the execution of certain applications such as the CAD application. CAD applications allow a user to draw and create objects in three dimensions for replication (e.g., via a 3D printer) in the real world or to generate designs, with dimensions, of products that may be fabricated in the real world. As such, when the CAD application is represented in the XR environment (e.g., VR environment), the drawing being created with the execution of the CAD application may be represented in three dimensions allowing the user to manipulate the drawing in the virtual world via gestures or an XR handheld controller 156. As such, as the CAD application is being reproduced within the XR environment, an API initiated by the XR switching system 164 and associated with the CAD application may convert aspects of the CAD application from a two-dimensional GUI to a three-dimensional GUI for viewing and interaction in an XR environment (e.g., a VR environment). Again, because the user may be allowed to manipulate the drawing represented within the CAD application via an XR handheld controller 156 or detected gesture, the user may want to gain physical access to input devices 140 such as the mouse 150, a stylus 146, a trackpad 148, or the keyboard 144. As such, the user may provide the XR switching input as described herein in order to switch from a VR environment to an AR or MR environment thereby allowing the user to see the location of these input devices and gain physical access to them during the operation of the CAD application on the HMD device 154. When the user removes the HMD device 154, the HMD wearing sensor 162 may send a signal to the XR switching system 164 which signals the information handling system 100 that the HMD device 154 has been removed and the information handling system 100 may, via execution of the APIs, reconvert any 3D renderings of applications back to 2D renderings for presentation of those applications on the video display device 142. The conversion APIs may then not be used. Further, the fiducial images 158 on any video display devices 142 may be turned off or deleted in some embodiments.

It is appreciated that the HMD device 154 may be used for additional purposes where switching from a first type of XR to a second type of XR provides additional benefits to a user or users. For example, the user may engage in a collaboration session with other users of additional HMD devices 120 that are remote, local, or a combination thereof. This collaboration session may include some or all of the users switching from a first type of XR to a second type of XR so that real-world objects such as a whiteboard or office space may be selectively viewable to the users. This may be helpful in, for example, designing a workspace where one or more users wearing the HMD devices 120 provide real-world and real-time views of a space to be designed to remote users who also can switch from the first type of XR to the second type of XR as they please in order to get different viewpoints as to how to design the space in the real world. Other example embodiments include sales meetings where a salesman providing solar panel installations, for example, can interact with a homeowner via the HMD device 154 so that the homeowner may visualize a solar panel installation via a VR environment and selectively view a solar panel installation on the user's own home via an AR environment or MR environment. This may increase sales of the solar panels by causing, via the salesman's event-driven sales pitch, the homeowner/user to see visually at one point a VR environment of the sales pitch, and at another point, via provisioning of the XR switching input, show via AR environment or MR environment what the solar panels can do and will look like when installed. Indeed, the HMD device 154 with the XR switching system 164 described herein may allow any user to collaborate with any other user for a variety of reasons.

The information handling system 100 can include one or more set of instructions 110 that can be executed to cause the computer system to perform any one or more of the methods or computer-based functions disclosed herein. For example, instructions 110 may execute an XR switching system 164, the machine learning gesture detection algorithm 172, the machine learning voice command detection algorithm 174, various software applications, software agents, or other aspects or components. Various software modules comprising application instructions 110 may be coordinated by an operating system (OS) 114, and/or via an application programming interface (API). An example OS 114 may include Windows®, Android®, and other OS types known in the art. Example APIs may include Win 32, Core Java API, or Android APIs.

The disk drive unit 118 and may include a computer-readable medium 108 in which one or more sets of instructions 110 such as software can be embedded to be executed by the processor 102 or other processing devices such as a GPU 152 to perform the processes described herein. Similarly, main memory 104 and static memory 106 may also contain a computer-readable medium for storage of one or more sets of instructions, parameters, or profiles 110 described herein. The disk drive unit 118 or static memory 106 also contain space for data storage. Further, the instructions 110 may embody one or more of the methods as described herein. In a particular embodiment, the instructions, parameters, and profiles 110 may reside completely, or at least partially, within the main memory 104, the static memory 106, and/or within the disk drive 116 during execution by the processor 102 or GPU 152 of information handling system 100. The main memory 104, GPU 152, and the processor 102 also may include computer-readable media.

Main memory 104 or other memory of the embodiments described herein may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The XR switching system 164, machine learning gesture detection algorithm 172, and machine learning voice command detection algorithm 174 may be stored in static memory 106 or on the drive unit 118 that may include access to a computer-readable medium 108 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In ab embodiment, the information handling system 100 may further include a power management unit (PMU) 120 (a.k.a. a power supply unit (PSU)). The PMU 120 may manage the power provided to the components of the information handling system 100 such as the processor 102, a cooling system, one or more drive units 118, the GPU 152, a video/graphic display device 142 or other input/output devices 140 such as the stylus 146, a mouse 150, a keyboard 144, and a trackpad 148 and other components that may require power when a power button has been actuated by a user. In an embodiment, the PMU 120 may monitor power levels and be electrically coupled, either wired or wirelessly, to the information handling system 100 to provide this power and coupled to bus 116 to provide or receive data or instructions. The PMU 120 may regulate power from a power source such as a battery 122 or A/C power adapter 124. In an embodiment, the battery 122 may be charged via the A/C power adapter 124 and provide power to the components of the information handling system 100 via a wired connections as applicable, or when A/C power from the A/C power adapter 124 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
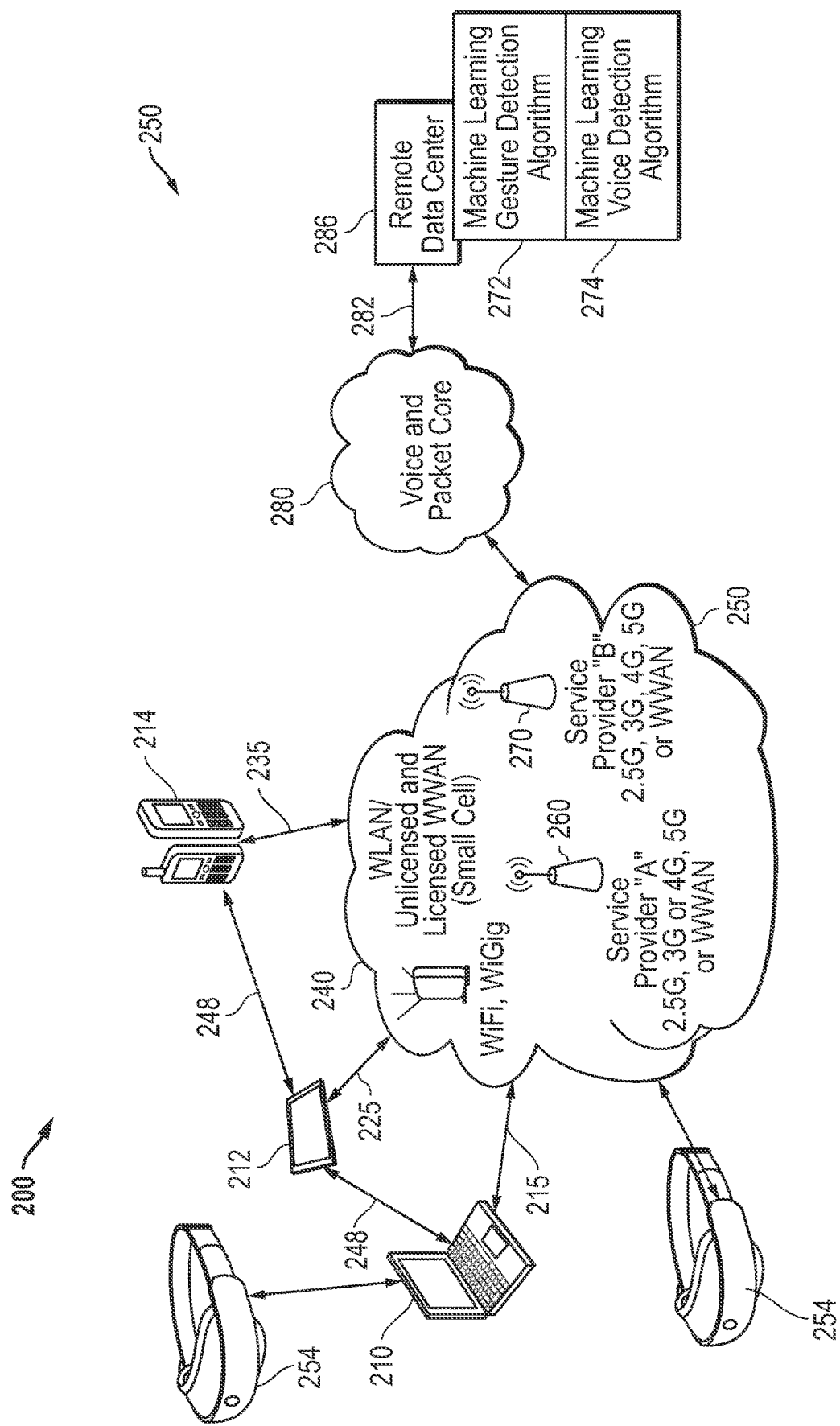
FIG. 2 is a block diagram of a network environment offering several communication protocol options and mobile information handling systems according to an embodiment of the present disclosure.

FIG. 2 illustrates a network 200 that can include one or more information handling systems 210, 212, 214. Additionally, one or more HMD devices 254 may be operatively coupled, wired or wirelessly, to the network 200 either directly or indirectly via the one or more information handling systems 210, 212, 214. The information handling systems 210, 212, 214 and HMD devices 254 shown in FIG. 2 may be similar to the information handling system 100 and HMD devices 154 described in connection with FIG. 1, respectively. In a particular embodiment, network 200 includes networked mobile information handling systems 210, 212, 214, HMD devices 254, wireless network access points, and multiple wireless connection link options. A variety of additional computing resources of network 200 may include client mobile information handling systems, data processing servers, network storage devices, local and wide area networks, or other resources as needed or desired. As partially depicted, information handling systems 210, 212, 214 may be a laptop computer, tablet computer, 360- degree convertible systems, wearable computing devices, or a smart phone device. These information handling systems 210, 212, 214, may access a wireless local network 240, or they may access a macro-cellular network 250. For example, the wireless local network 240 may be the wireless local area network (WLAN), a wireless personal area network (WPAN), or a wireless wide area network (WWAN). In an example embodiment, LTE-LAA WWAN may operate with a small-cell WWAN wireless access point option.

Since WPAN or Wi-Fi Direct Connection 248 and WWAN networks can functionally operate similar to WLANs, they may be considered as wireless local area networks (WLANs) for purposes herein. Components of a WLAN may be connected by wireline or Ethernet connections to a wider external network such as a voice and packet core 280. For example, wireless network access points (e.g., 136 FIG. 1) or base stations (e.g., 138, FIG. 1) may be connected to a wireless network controller and an Ethernet switch. Wireless communications across wireless local network 240 may be via standard protocols such as IEEE 802.11 Wi-Fi, IEEE 802.11ad WiGig, IEEE 802.15 WPAN, IEEE 802.11ax-2021, (e.g., Wi-Fi 6 and 6E, 6 GHz technologies), or emerging 5G small cell WWAN communications such as gNodeB, eNodeB, or similar wireless network protocols and access points. Alternatively, other available wireless links within network 200 may include macro-cellular connections 250 via one or more service providers 260 and 270. As described herein, a plurality of antennas may be operatively coupled to any of the macro-cellular connections 250 via one or more service providers 260 and 270 or to the wireless local area networks (WLANs) selectively based on the SAR data, RSSI data, configuration data, system operation and connection metrics, peripheral telemetry data, and antenna mounting locations (e.g., spatial locations of antennas within the information handling system) associated with each information handling systems 210, 212, 214 as described herein. Service provider macro-cellular connections may include 2G standards such as GSM, 2.5G standards such as GSM EDGE and GPRS, 3G standards such as W-CDMA/UMTS and CDMA 2000, 4G standards, or emerging 5G standards including WiMAX, LTE, and LTE Advanced, LTE-LAA, small cell WWAN, and the like.

Wireless local network 240 and macro-cellular network 250 may include a variety of licensed, unlicensed or shared communication frequency bands as well as a variety of wireless protocol technologies ranging from those operating in macrocells, small cells, picocells, or femtocells. As described herein, utilization of RF communication bands according to several example embodiments of the present disclosure may include bands used with the WLAN standards and WWAN carriers which may operate in both licensed and unlicensed spectrums. For example, both WLAN and WWAN may use the Unlicensed National Information Infrastructure (U-NII) band which typically operates in the ~5 MHz frequency band such as 802.11 a/h/j/n/ac/ax (e.g., center frequencies between 5.170-7.125 GHz). WLAN, for example, may operate at a 2.4 GHz band, 5 GHz band, and/or a 6 GHz band according to, for example, Wi-Fi, Wi-Fi 6, or Wi-Fi 6E standards. WWAN may operate in a number of bands, some of which are proprietary but may include a wireless communication frequency band. For example, low-band 5G may operate at frequencies similar to 4G standards at 600-850 MHz. Mid-band 5G may operate at frequencies between 2.5 and 3.7 GHz. Additionally, high-band 5G frequencies may operate at 25 to 39 GHz and even higher. In additional examples, WWAN carrier licensed bands may operate at the new radio frequency range 1 (NRFR1), NFRF2, bands, and other known bands. Each of these frequencies used to communicate over the network 240, 250 may be based on the radio access network (RAN) standards that implement, for example, eNodeB or gNodeB hardware connected to mobile phone networks (e.g., cellular networks) used to communicate with the information handling systems 210, 212, 214 and HMD devices 254. In the example embodiment, mobile one or more information handling systems 210, 220, 230 may also include both unlicensed wireless RF communication capabilities as well as licensed wireless RF communication capabilities. For example, licensed wireless RF communication capabilities may be available via a subscriber carrier wireless service operating the cellular networks. With the licensed wireless RF communication capability, an WWAN RF front end of the information handling systems 210, 212, 214 may operate on a licensed WWAN wireless radio with authorization for subscriber access to a wireless service provider on a carrier licensed frequency band. WLAN such as Wi-Fi (e.g., Wi-Fi 6) may be unlicensed.

In some embodiments, a networked mobile information handling system 210, 212, 214 and/or HMD devices 254 may have a plurality of wireless network interface systems capable of transmitting simultaneously within a shared communication frequency band. That communication within a shared communication frequency band may be sourced from different protocols on parallel wireless network interface systems or from a single wireless network interface system capable of transmitting and receiving from multiple protocols. Similarly, a single antenna or the plurality of antennas in each information handling systems 210, 212, 214 or HMD devices 254 may be used on each of the wireless communication devices such as according to embodiments herein and may be suited to plural RF bands. Example competing protocols may be local wireless network access protocols such as Wi-Fi/WLAN, WiGig, and small cell WWAN in an unlicensed, shared communication frequency band. Example communication frequency bands may include unlicensed 5 GHz frequency bands or 3.5 GHz conditional shared communication frequency bands under FCC Part 96. Wi-Fi ISM frequency bands may be subject to sharing include 2.4 GHz, 60 GHz, 900 MHz or similar bands as understood by those of skill in the art. Within local portion of wireless network 250 access points for Wi-Fi or WiGig as well as small cell WWAN connectivity may be available in emerging 5G technology. This may create situations where a plurality of antenna systems that are operating on a mobile information handling system 210, 212, 214 via concurrent communication wireless links on both WLAN and WWAN radios and antenna systems. In some embodiments, concurrent wireless links may operate within the same, adjacent, or otherwise interfering communication frequency bands and may be required to utilize spaced antennas. The antenna may be a transmitting antenna that includes high-band, medium-band, low-band, and unlicensed band transmitting antennas in embodiments herein. The antenna may cooperate with other antennas in a N×N MIMO array configuration according to the embodiments described herein. Alternatively, embodiments may include a single transceiving antennas capable of receiving and transmitting, and/or more than one transceiving antennas. Each of the antennas included in the information handling systems 210, 212, 214 and/or HMD devices 254 in an embodiment may be subject to the FCC regulations on specific absorption rate (SAR).

The voice and packet core network 280 shown in FIG. 2 may contain externally accessible computing resources and connect to a remote data center 286. The voice and packet core network 280 may contain multiple intermediate web servers or other locations with accessible data (not shown). The voice and packet core network 280 may also connect to other wireless networks similar to 240 or 250 and additional mobile information handling systems such as 210, 212, 214, HMD devices 254, or similar connected to those additional wireless networks. Connection 282 between the wireless network 240 and remote data center 286 or connection to other additional wireless networks may be via Ethernet or another similar connection to the world-wide-web, a WAN, a LAN, another WLAN, or other network structure. Such a connection 282 may be made via a WLAN access point/Ethernet switch to the external network and be a backhaul connection. The access point may be connected to one or more wireless access points in the WLAN before connecting directly to a mobile information handling system or may connect directly to one or more information handling systems 210, 212, 214 and/or HMD devices 254. Alternatively, mobile information handling systems 210, 212, 214 and or HMD devices 254 may connect to the external network via base station locations at service providers such as 260 and 270. These service provider locations may be network connected via backhaul connectivity through the voice and packet core network 280.

Remote data centers 286 may include web servers or resources within a cloud environment that operate via the voice and packet core 280 or other wider internet connectivity. For example, remote data centers can include additional information handling systems, data processing servers, network storage devices, local and wide area networks, or other resources as needed or desired. In an embodiment, the remote data center 286 may include the machine data storage devices that store the computer code and instructions that define the machine learning gesture detection algorithm 272 and machine learning voice command detection algorithm 274 among other data. As described herein, in an embodiment, the remote data center 286 may also include remote processing resources that create gesture detection models from the execution of the machine learning gesture detection algorithm 272 and voice command detection models from the execution of the machine learning voice command detection algorithm 274. In an embodiment, the remote data center 286 may receive input data from the information handling systems 210, 212, and 214 describing gestures and voice commands detected by the HMD devices 254. This input data may be used to train the machine learning gesture detection algorithm 272 and machine learning voice command detection algorithm 274 in order to receive, as output, the trained gesture models and trained voice command models. In an embodiment and because the processing resources used to execute the trained gesture models and the trained voice command models by the HMD devices 254 and/or information handling systems 210, 212, and 214 are significantly less than the execution of the machine learning gesture detection algorithm 272 and machine learning voice command detection algorithm 274, the models may be updated regularly at the information handling systems 210, 212, and 214 so that gestures and voice commands presented by the user will be detectable and identified as XR switching input as described herein.

Again, having such remote capabilities at the remote data center 286 may permit fewer resources to be maintained at the mobile information handling systems 210, 212, 214 or HMD devices 254 allowing streamlining and efficiency within those devices. In an embodiment, the remote information management system 288 may be part of a 5G multi-edge compute server placed at an edge location on the network 200 for access by the information handling systems 210, 212, 214 and/or HMD devices 254. In an embodiment, the remote data center 286 permits fewer resources to be maintained in other parts of network 200. In an example embodiment, processing resources on the remote data center 286 may requests from HMD devices 254 to engage in training and XR environments. Although an information handling system 210, 212, 214 may be used to process some of the data used to provide a VR, AR, and/or MR environment to the displays of the HMD devices 254, the remote data center 286 may facilitate the information handling systems 210, 212, and 214 to perform those tasks described herein such as provisioning of an XR at the HMD devices 254, detecting voice commands and gestures, providing the gesture and voice command input to the machine learning gesture detection algorithm 272 and machine learning voice command detection algorithm 274, and providing gesture, among other tasks described herein.

In this embodiment, a trained gesture detection algorithm may be sent back to the mobile information handling systems 210, 220, and 230 and/or HMD devices 254. In an example embodiment, the mobile information handling systems 210, 220, and 230 or HMD devices 254 may communicate with a backend server such as the remote data center 286 or other server on at least one radio access technology (RAT) network to execute other remote applications or access remote data, websites, or communications.

Although communication links 215, 225, and 235 are shown connecting wireless adapters of information handling systems 210, 212, 214 to wireless networks 240 or 250, a variety of wireless links are contemplated. Wireless communication may link through a wireless access point (e.g., Wi-Fi), through unlicensed WWAN small cell base stations such as in network 240 or through a service provider tower and base stations such as that shown with service provider A 260 or service provider B 270 and in network 250. In other aspects, mobile information handling systems 210, 212, 214 may communicate intra-device via inter-communication links 248 when one or more of the information handling systems 210, 212, 214 are set to act as an access point or even potentially an WWAN connection via small cell communication on licensed or unlicensed WWAN connections. For example, one of mobile information handling systems 210, 212, 214 may serve as a Wi-Fi hotspot in an embodiment. Concurrent wireless links to information handling systems 210, 212, 214 may be connected via any access points including other mobile information handling systems as illustrated in FIG. 2.

Figure 3:
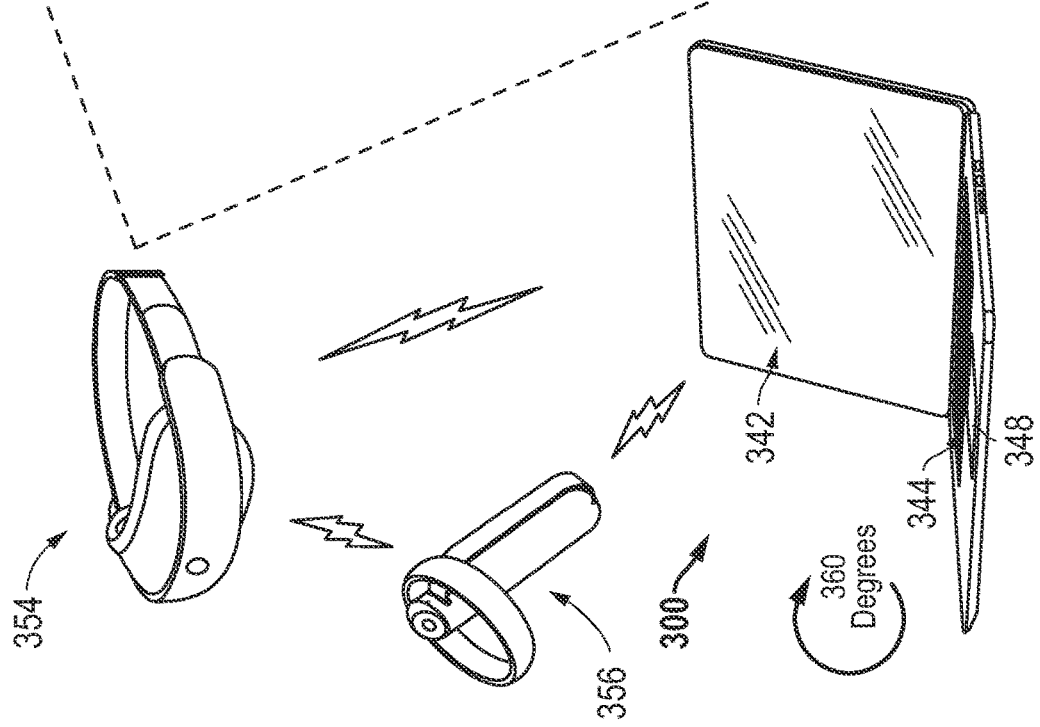
FIG. 3 is a block diagram illustrating an HMD device operatively coupled to an information handling system according to an embodiment of the present disclosure.

FIG. 3 is a block diagram illustrating an HMD device 354 operatively coupled to an information handling system 300 according to an embodiment of the present disclosure. As described herein, the HMD device 354 may be communicatively coupled to the information handling system 300 either via a wired or wireless connection. In an embodiment, the information handling system 300 may be remote to the user operating the HMD device 354 or may be local with the information handling system 300 acting as an intermediary device to a remote information management system on a network as described herein.

As partially depicted, information handling system 300 may be a laptop computer such as a 360-degree convertible system. The information handling system 300 may include a keyboard 344, a mouse (not shown), a video/graphic display 342, a stylus (not shown), a trackpad 348, and HMD handheld controller 356, or any combination thereof. These input devices may be used to communicate with the HMD device 354 and provide output to the user via, for example, a visual representation on the video/graphic display 342 of what the user sees when operating the HMD device 354. For example, the HMD handheld controller 356 may be operatively coupled wirelessly or by wire to the HMD device 354, to the information handling system 300, or both. As described herein, the HMD device 354 may include an HMD wireless radio 368 to the information handling system 300 and HMD handheld 356. The HMD wireless radio 368 may be used to operative coupled the HMD device 354 to the HMD handheld controller 356 and/or the information handling system 300. In an embodiment, the HMD device 354 and XR handheld controller 356 may be operatively coupled to one another and, optionally, to the information handling system 300 either via a wired or wireless connection such as Bluetooth or other protocol as described herein.

As described herein, the HMD device 354 may include any number of sensors used to determine the position of the HMD device 354 within an environment by executing, with a processor, the HMD device position engine 334. For example, the HMD device 354 in an embodiment may include positional sensors such as a global positioning system (GPS) unit 322, an inertial measurement unit (IMU) 324, an e-Compass unit 326, and/or other positional measurement tools such as an accelerometer, a capacitive transducer, a hall effect sensor, a laser doppler vibrometer, a multi-axis displacement transducer, a potentiometer, or a confocal chromatic sensor. Other positional sensors are also contemplated, including a capacitive displacement sensor, an eddy-current sensor, an ultrasonic sensor, a grating sensor, an inductive non-contact position sensor, a linear variable differential transformer, a photodiode array, a piezoelectric transducer, a proximity sensor, a rotary encoder, a seismic displacement pick-up, and a string potentiometer, along with any other positional sensors developed in the future. The positional sensors (e.g., GPS unit 322, IMU 324, and/or eCompass unit 326) in an embodiment may operate to measure location coordinates (x, y, z) of the HMD device 354, as well as orientation (θ), velocity, and/or acceleration. Velocity, acceleration, and trajectory of the HMD device 354 in such an embodiment may be determined by comparing a plurality of measured location coordinates and orientations taken over a known period of time, or may be measured directly by onboard positional sensor such as an accelerometer. Again, a SLAM process may be executed by a SLAM engine 335, in an embodiment as part of an HMD position engine 334, in order to identify the position of the headset with respect to its surrounding environment, model the surrounding environment as viewed from the perspective of the headset wearer, and render the modeled image and virtual elements in a three-dimensional environment matching or relative to the surrounding real-world environment, among other tasks.

In another embodiment, the HMD device 354 may include or interact with other types of positional devices that provide data to the HMD device 354 to determine the location of the HMD device 354 within a physical environment. For example, an Internet-of-Things (IoT) device may include sensors that may be detectable by the HMD device 354 that provides data to the HMD device 354 that it is within a physical environment. This may include tags, transponders, or other location tags that can be used to triangulate the location of the HMD device 354 within the physical environment. Other sensors such as IR detectors 338 and IR emitters 336 or visible light versions of the same, for example, either on the HMD device 354 (e.g., inward-out location detection) or located within the physical environment (e.g., outward-in location detection), that is used to triangulate or multi-laterate the location of the HMD device 354 within the physical environment.

The HMD device 354 may also be capable of capturing video or still images of its surrounding physical environment, which may include one or more identifiable landmarks. For example, the HMD device 354 may include a camera such as a camera/pass-through camera 328. The camera/pass-through camera 328 may capture a two-dimensional image of the surrounding physical environment, which may be combined with distance measurements gathered by a plurality of IR emitters 336 and IR detectors 338 to generate a three-dimensional image of the surrounding environment as a reference for XR applications. The camera 328 in an embodiment may be, for example, a stereo triangulation camera, an Infrared (IR) camera, a sheet of light triangulation camera, a structured light camera, a time-of-flight camera, an interferometry camera, a coded aperture camera, a RGB digital camera, an infrared digital camera, a telephoto lens digital camera, a fish-eye digital camera, a wide-angle digital camera, a close-focus digital camera, or any other type of camera. The three-dimensional image captured by a camera/pass-through camera 328 in an embodiment may be used to determine the position and orientation of the HMD device 354 with respect to the one or more landmarks viewable within the physical environment for reference of motion in an AR, VR, or MR environment presented to a user of the HMD device 354. In an embodiment, the camera/pass-through camera 328 may be used for image recognition of gestures, or used with an HMD handheld controller 356 to interact with an XR environment or content therein.

The HMD device 354 in an embodiment may further include an HMD CPU/GPU/XR processor 332 or other processor, which may execute instructions to provide images to the user via the HMD display device 340 of the HMD device 354. Such instructions executed by the HMD CPU/GPU/XR processor 332 or other processor in an embodiment may include those instructions used to create the VR environment, the AR environment, and/or the MR environment by projecting images to the user whether those images are superimposed over real-world images captured by the camera/pass-through camera 328 or not.

The HMD CPU/GPU/XR processor 332 or other processor may also transmit an image of the surrounding environment captured by the camera/pass-through camera 328, the measured position (x, y, z), orientation (θ), velocity, and/or acceleration of the HMD device 354 to the wirelessly connected laptop or desktop information handling system 300 via a network adapter and a wireless radio 368 in an embodiment. The HMD CPU/GPU/XR processor 332 or other processor may also receive SLAM frames indicating the positions of the HMD device 354 and one or more identified landmarks in the surrounding environment from the remotely connected laptop or desktop information handling system 300 via the network adapter.

The HMD CPU/GPU/XR processor 332 or other processor in an such an embodiment may determine the position/orientation of identified landmarks with respect to the HMD device 354 through analysis of the positional information measured in the image captured by the camera 328 in combination with an identification by a landmark tracking module 346 of the one or more landmarks. In some embodiments, such positional/orientation information may be received at the HMD CPU/GPU/XR processor 332 or other processor from the remotely located laptop or desktop information handling system 300 via a network adapter as described herein.

The HMD device 354 in an embodiment may further include one or more subsystems capable of identifying one or more landmarks within three-dimensional image information as described herein. For example, the HMD device 354 may include a landmark tracking module 346. The landmark tracking module 346 in an embodiment may access the three-dimensional image information of one or more nearby landmarks captured by the HMD device 354. In some embodiments, the landmark tracking module 346 may identify the physical boundaries of one or more potential landmarks within the three-dimensional image captured by the camera/pass-through camera 328. Once the physical boundaries of the landmarks are identified by the landmark tracking module 346 in an embodiment, the distance between these identified items and the HMD device 354 may be determined.

A plurality of IR emitters 336 may be mounted along the exterior of the HMD device 354 in an embodiment. Each IR emitters 336 (e.g., an infrared light emitting diode) in an embodiment may operate to emit infrared (IR) light toward the environment surrounding the HMD device 354. In some embodiments, the light emitted from each IR emitter 336 may be patterned, and each IR emitter 336 may emit the same pattern, or different IR emitters 336 may emit different patterns. The intensity of light emitted from each of the IR emitters 336 in an embodiment may be controlled by the HMD CPU/GPU/XR processor 332, a controller (not shown), or an integrated circuit or chip (not shown) executing firmware instructions of the IR emitters 336. Such firmware may also identify the position of each IR emitter 336 along the exterior of the HMD device 354 (e.g., position with respect to field of view of headset).

The HMD device 354 may further include one or more IR detectors 338 capable of detecting infrared light emitted from the plurality of IR emitters 336 reflecting off the surfaces of landmarks or objects within the environment surrounding the HMD device 354. IR detectors 338, in an embodiment, may be composed of IR light emitting detector or detector capable of generating an electrical current based on received or detected infrared light. Electrical currents generated by the plurality of IR detectors 338 in an embodiment may be used to determine a length of time during which light emitted from an IR emitter 336 traveled toward an object in the environment surrounding the HMD device 354, then travelled back toward the IR detector 338 upon reflection. This process is referred to a as time-of-flight or time-of-arrival detection process for triangulation or multilateration. In an embodiment, the IR detectors 338 may be used with the HMD handheld controller 356 as well to detect the position of the HMD handheld controller 356. For example, the HMD handheld controller 356 may include one or more IR emitters similar to the IR emitters 336 on the HMD device 354 that can be used by the IR detector 338 to detect the position of the HMD handheld controller 356. The present specification further contemplates the use of visible light detectors or other handheld controller position detectors and HMD device 354 position detectors.

The HMD device 354 may further include one or more subsystems capable of mapping the positions/orientations of the HMD device 354 and one or more identified landmarks within a virtual three-dimensional environment in an embodiment. For example, the HMD device 354 may include a head mounted display (HMD) device position engine 334 that may include, in an embodiment, a simultaneous localization and mapping (SLAM) engine 335. The SLAM engine 335, in an embodiment, may access the position/orientation information for the one or more landmarks with respect to the HMD device 354 generated or received by the HMD CPU/GPU/XR processor 332, and use this information to generate a three-dimensional virtual map of HMD device 354 and its surrounding environment, including the one or more identified landmarks. In other embodiments, the HMD CPU/GPU/XR processor 332 may receive one or more SLAM frames including three-dimensional virtual maps of the HMD device 354 and its surrounding environment from the remotely located laptop or desktop information handling system 300 via a network adapter.

In an embodiment, one or more subsystems capable of rendering an image of the surrounding physical environment or an XR image version of the same or a new VR environment from the perspective of the HMD device 354 may also be included onboard the HMD device 354. For example, the HMD device 354 may include an optics engine 358, which may access the three-dimensional virtual map generated by the SLAM engine 335 or received from the remotely located information handling system 300 in an embodiment. The optics engine 358 in an embodiment may render a three-dimensional image of the surrounding environment including the identified one or more landmarks based on the location/orientation of the landmarks with respect to the HMD device 354 within the virtual map, as with a VR environment. In other embodiments, the optics engine 358 may render a three-dimensional image of an object projected to appear as if it is incorporated within the environment surrounding the HMD device 354, as with an AR environment or even a MR environment.

The HMD device 354 in an embodiment may further include one or more subsystems capable of and displaying the rendered image of the surrounding physical environment or a virtual XR environment with positions relative to a physical surrounding within the HMD device 354. For example, the HMD device 354 may include a head mounted HMD display device 340, capable of displaying the image (e.g., VR image, AR image, or MR image) rendered by the optics engine 358.

The HMD device 354 in an embodiment may further include an XR switching system 364. The XR switching system 364 may be, in an example embodiment, computer readable program code that, when executed by HMD CPU/GPU/XR processor 332, switches from operating with no HMD device 354 being used to operation with an HMD device being worn and used with an XR environment. As described herein, the XR switching system 364 may be activated after the HMD CPU/GPU/XR processor 332 or other processing resource (e.g., processor of information handling system 300) has received a signal from the HMD wearing sensor 362 that the user has put the HMD device 354 on in an embodiment. The XR switching system may then proceed to detect that the fiducial images are presented to the user via that video display device 342 of the information handling system 300. When this occurs, the XR switching system 364 of the HMD device 354 may switch from a real-world image or no images being presented on the HMD display device 340 to an XR environment being presented to the user the includes, at least, an XR image version of the contents of the video display images to be presented to the user via the video display device by executing software applications as descried herein. The XR environment may be a default type of XR, selected from VR, AR, or MR, or may default to the most recent version of XR used with the HMD device 354.

The HMD wearing sensor 362 may be any type of sensor that detects when the HMD device 354 is being worn by the user and when the HMD device 354 is not being worn by the user. According to the methods and systems described herein, as the user wears the HMD device 354, the XR switching system 364 causes the XR environment that is displayed to the user to include a replication of, at least, the images, windows, and applications that would be presented to the user via the video display device 342. In order to determine when to replicate this data within the XR environment, the HMD device 354 executing the XR switching system 364 may receive data from the HMD wearing sensor 362 indicating when the user has donned or removed the HMD device 354. In an embodiment, the HMD wearing sensor 362 may include an eye tracking system that tracks the user's eyes via an internal camera. Other HMD wearing sensors 362 may include a capacitive sensor, a resistive sensor, a light or IR sensor, a motion sensor, a Hall effect sensor, any combination or some other sensor. In this example embodiment, when the eye tracking system detects the presence of the user's eyes or another sensor detects the user, the images, windows, and applications originally presented to the user on the video display device 342 may be replicated as XR image versions within the XR environment at the HMD device 354. Accordingly, when the eye tracking system does not detect the presence of the user's eyes or another sensor detects that the user has removed the HMD device 354, the replication of the images, windows, and applications may end and those applications may be displayed on the video display device 342 again. The HMD wearing sensor 362, therefore, may continuously detect whether the user is wearing the HMD device 354 or not and replicate those images, windows, and applications accordingly. It is appreciated that the HMD wearing sensor 362 may include any other type of sensor such as an accelerometer, a contact switch placed within the HMD device 354, and/or a light sensor, among other user-detection methods, systems, and devices.

As the HMD wearing sensor 362 detects the presence of the user, a communication may be sent to the information handling system 300 such that the fiducial image 358 generated during the initialization of the HMD device 354 may be displayed on the video display device 342. In an embodiment, the display of the fiducial image (not shown) on the video display device 342 such as via the GPU may result from the processor or GPU of the information handling system 300 receiving a signal from the HMD wearing sensor 362 of the HMD device 354 (e.g., via OOB communication) that the HMD device 354 is currently being worn by the user. At this point, the information handling system 300 may send a signal to the HMD device 354 that the fiducial image 358 is being displayed on the video display device 342 and that the HMD device 354 can now activate the camera/pass-through camera 360 in order to detect that fiducial image 358. Upon recognition of the fiducial image 358, the HMD device 354 may display an XR environment depicting a virtual XR image version of, at least, the images, applications, and windows previously displayed on the video display device 342 and relative to a location of the corresponding video display device 342. Relative XR image version locations displayed in the HMD may be located near the detected fiducial 358 as a location beacon or, in some embodiments, may be moved to a different desired location for use or interaction depending on the software application or the XR environment simulation requirements.

The XR switching system 364 may also execute computer readable program code that, when executed by HMD CPU/GPU/XR processor 332, switches from a first type of XR (e.g., VR environment, AR environment, or MR environment) to a second type of XR (e.g., VR environment, AR environment, or MR environment) upon detection of XR switching input. As described herein, the HMD device 354 may be capable of generating and presenting to a user any type of XR images including AR, VR, and MR, or any other type of XR provided by the HMD device and contemplated to exist along a reality-virtuality continuum. In an embodiment, a user may cause the XR switching system 364 to switch from a first type of XR to a second type of XR by providing input to the HMD device 354. In an embodiment, this input may include a button or switch formed on the HMD device 354 or on the HMD handheld controller 356 that a user may activate to cause input (e.g., XR switching input) to be sent to the XR switching system 364 to switch from the first type of XR to the second type of XR. This analog input from the user may allow a user to toggle between, for example, AR, VR, or MR based on the position of the switch or a plurality of times the user actuates the switch.

In another embodiment, the XR switching system 364 may implement a gesture detection process to determine whether a user is intending to switch from a first type of XR to a second type of XR. The gesture detection process may include detecting a gesture by a user via the camera/pass-through camera 328 and determining whether that gesture is a triggering gesture used as XR switching input by the XR switching system 364 to switch from the first type of XR to the second type of XR. For example, a user may present, in front of the camera/pass-through camera 328 of the HMD device 354 a predetermine hand gesture and, in an example embodiment, the XR switching system 364 may execute or have executed a machine learning gesture detection algorithm 372 used to detect a gesture of a user and provide output indicating whether the detected gesture is or is not the triggering gesture. In this embodiment, the operation of the camera/pass-through camera 328 or other sensing device may detect a user's gesture via execution of the machine learning gesture detection algorithm 372 or gesture detection module by an HMD CPU/GPU/XR processor 332 by detecting movement of the user's body parts such as, in this example, the user's hand. The camera/pass-through camera 328 and other sensors may be used to detect the vector movements of the user's hand and processes those signals using machine learning techniques that can classify those gestures. During operation and after the camera/pass-through camera 328 has detected movement by the user, detected tagged telemetry data may be provided to a machine learning gesture detection algorithm 372 as input. In an embodiment, the machine learning gesture detection algorithm 372 may classify this detected movement of the user to determine if a predetermined triggering gesture is being presented by the user. Where the machine learning gesture detection algorithm 372 determines that a triggering gesture has been detected, the output may be presented to the processor executing the XR switching system 364. In an embodiment, the machine learning gesture detection algorithm 372 may be executed at the information handling system 300 at a processor (e.g., 102, FIG. 1) and by the OS, in some embodiments, in whole or in part remotely on a server that includes computing resources, or via an HMD CPU/GPU/XR processor 332 on the HMD device 354. In one example embodiment, the machine learning gesture detection algorithm 372 may be remote from the information handling system 300 to be trained remotely. In an embodiment, the machine learning gesture detection algorithm 372 operating at the processor and OS on the information handling system 300 may be a trained module sent to the information handling system 300 from these remote processing after the machine learning gesture detection algorithm 372 had been trained. During operation and when the machine learning gesture detection algorithm 372 provides output indicating that a triggering gesture has been detected, this gesture data may be provided to the HMD CPU/GPU/XR processor 332 for the HMD CPU/GPU/XR processor 332 to execute a switching from a first type of XR to a second type of XR.

In an embodiment, the HMD device 354 may be operatively coupled to one or more handheld controllers 356. These handheld controllers 356 may allow a user of the HMD device 354 to interact with virtual objects displayed to the user in the XR surrounding environment such as grab virtual objects or move virtual objects. As described herein, the HMD device 354 may present to the user a VR environment, an MR environment, or an AR environment. The VR environment includes a complete virtual image presented to the user via the HMD display device 340 of the HMD device 354 and may provide no real-world images (e.g., images of the physical environment around the HMD device 354) to the user concurrently via, for example, images obtained by a camera/pass-through camera 328 on the HMD device 354. The AR environment may include images of objects that are overlayed onto real world images presented to the user via the HMD display device 340 of the HMD device 354. The AR environment includes, in an embodiment, computer-generated perceptual information enhancing those real-world images (e.g., images of the physical environment around the HMD device 354) presented to the user via the HMD display device 340 of the HMD device 354. In an embodiment, this computer-generated perceptual information may include multiple sensory modalities such as visual, auditory, haptic, somatosensory and even olfactory modalities. The AR environment may, therefore, include a projection of real-world environment images (e.g., presented at the HMD display device 340 of the HMD device 354) with information or objects added virtually as an overlay. MR environments may include a merging of real-world images (e.g., images of the physical environment around the HMD device 354) captured by the camera and virtual, computer-generated images that are presented to the user. In an embodiment, unlike in AR, the user interacting in an MR environment may interact with the digital-objects presented to the user. The HMD handheld controller 356 may include one or more input buttons that allow the user to perform various functions while viewing an XR environment. In an embodiment, the HMD handheld controller 356 may communicate wirelessly with the HMD device 354 using, for example, a Bluetooth connection or some other wireless protocol as described herein.

Additionally, or alternatively, the XR switching system 364 may implement a voice command detection process via execution of a machine learning voice command detection algorithm 374 by a processor (e.g., processor or GPU of the information handling system or the HMD CPU/GPU/XR processor 332) to determine whether a user is intending to switch from a first type of XR to a second type of XR. The voice command detection process may include detecting a voice command from user via, for example, a microphone 376 and determining whether that voice command is a triggering voice command (e.g., used as XR switching input) within the surrounding XR environment used to switch from the first type of XR to the second type of XR. For example, a user may speak a predetermine voice command (e.g., "switch to augmented reality") and, in an example embodiment, the XR switching system 364 may execute or have executed the machine learning voice command detection algorithm 374 used to detect a voice command of a user and provide output indicating whether the detected voice command is or is not the triggering voice command. It is appreciated that, like the execution of the machine learning gesture detection algorithm 372, the execution of the machine learning voice command detection algorithm 374 may be based on the microphone detecting the voice of the user (e.g., similar to a gesture detected by the camera/pass-through camera 328). In this embodiment, the operation of the microphone 376 or other voice sensing device may detect a user's voice command by detecting changes in decibel levels around the HMD device 154. The microphone 376 and other sensors may be used to detect the voice command and processes those signals using machine learning techniques that can classify those voice commands (e.g., machine learning voice command detection algorithm 374).

After the microphone 376 has detected a voice command from the user, detected voice data may be provided to a machine learning voice command detection algorithm 374 as input. In an embodiment, the machine learning voice command detection algorithm 374 may classify this detected voice command from the user to determine if a predetermined triggering voice command is being presented by the user. Where the machine learning voice command detection algorithm 374 determines that a triggering voice command has been detected, the output may be presented to the processor executing the XR switching system 364. In an embodiment, the machine learning voice command detection algorithm 374 may be executed at the information handling system 300 at a processor and by the OS, in some embodiments, in whole or in part remotely on a server that includes computing resources, and/or via a processing device on the HMD device 354.

In one example embodiment, the machine learning voice command detection algorithm 374 may be remote from the information handling system 300 to be trained remotely. In an embodiment, the machine learning voice command detection algorithm 374 operating at the processor and OS (and/or an HMD CPU/GPU/XR processor 332) on the information handling system 300 may be a trained module sent to the information handling system 300 from these remote processing service after the machine learning voice command detection algorithm 374 had been trained. During operation and when the trained machine learning voice command detection algorithm 374 provides output indicating that a triggering voice command has been detected, this voice data may be provided to the processor for the processor to execute a switching from a first type of XR to a second type of XR.

Figure 4:
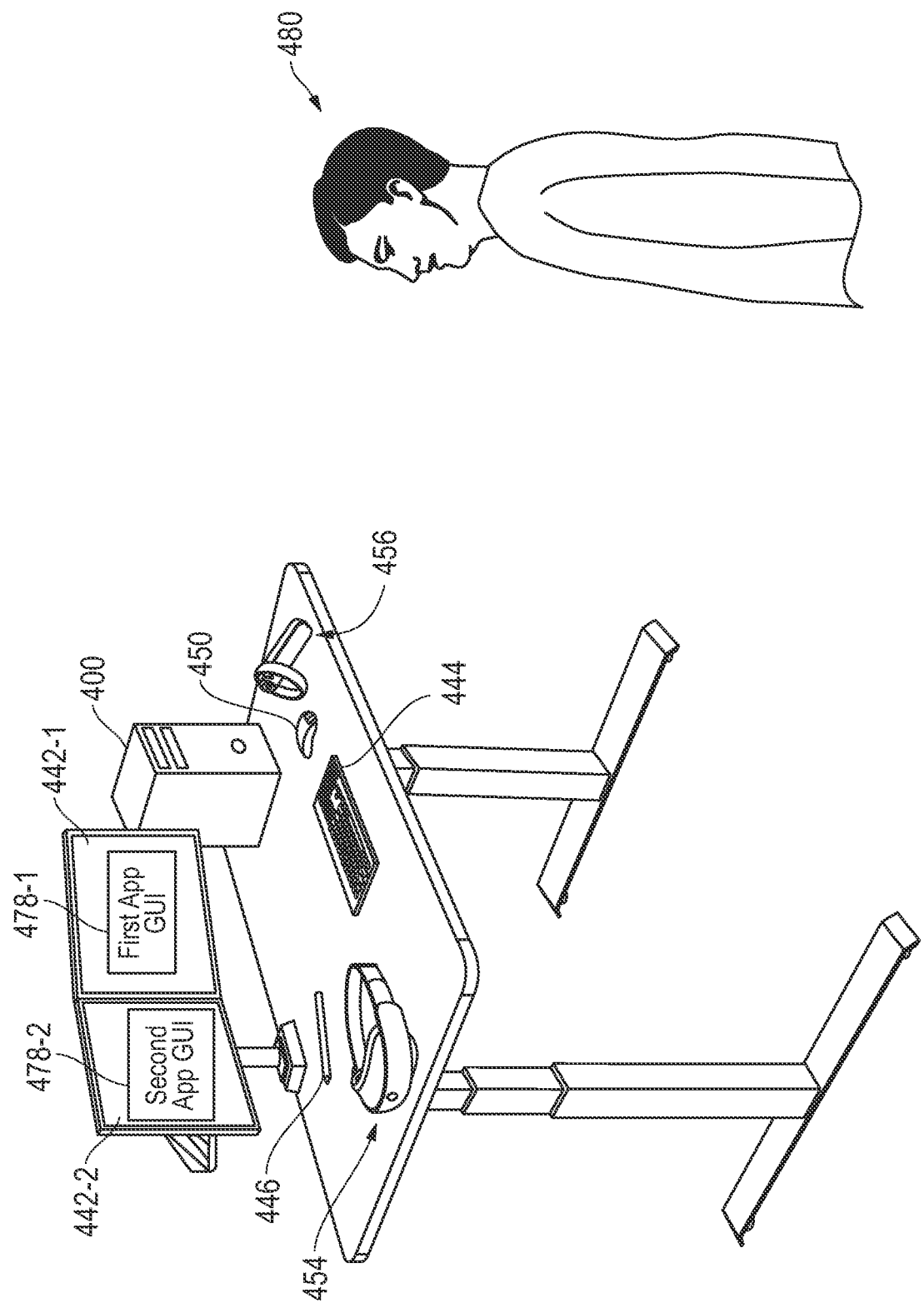
FIG. 4 is a block diagram illustrating an HMD device and information handling system with one or more video display devices according to an embodiment of the present disclosure.

FIG. 4 is a block diagram illustrating an HMD device 454 and information handling system 400 according to an embodiment of the present disclosure. In the example embodiment, the information handling system 400 may be a desktop-type information handling system 400 that includes a tower operatively coupled to, in an example, a first video display device 442-1 and a second video display device 442-2. The use of the first video display device 442-1 and the second video display device 442-2 may facilitate the extension of the user's desktop thereby providing more area for a first application GUI 478-1 to be displayed on the first video display device 442-1 and a second application GUI 478-2 to be displayed on the second video display device 442-2. As described herein, the first application GUI 478-1 and second application GUI 478-2 may be in the form of one or more windows. In an embodiment, when the windows representing the first application GUI 478-1 and/or second application GUI 478-2 are minimized or otherwise removed from view, the user may be shown a desktop that may include one or more icons or shortcuts to the execution of individual applications by the information handling system 400.

FIG. 4 shows a user 480 engaged with the operations of the information handling system 400 and may be actively engaged with the execution of the first application GUI 478-1 and second application GUI 478-2. In an example embodiment, the first application GUI 478-1 may be, for example, a word processing application being executed by the information handling system 400. In an example embodiment, the second application GUI 478-2 may be, for example, a CAD application being executed by the information handling system 400. It is appreciated that these are example applications and the first application GUI 478-1 and second application GUI 478-2 may be any type of application as described herein. In an embodiment, the user may interact with the first application GUI 478-1 and second application GUI 478-2 via the images displayed in 2D on the video display devices 442-1, 442-2. Here, the user may interact with these images, windows, and other application data using a keyboard 444, a stylus 446, a mouse 450, or a touchscreen on the video display devices 442-1, 442-2.

As shown in FIG. 4, the user 480 may be provided the opportunity to put on the HMD device 454 in order to interact with the images displayed on the video display devices 442-1, 442-2 associated with the first application GUI 478-1 and second application GUI 478-2 in an XR environment. As described herein, the XR environment may provide the user with additional capabilities to interact with these images by, for example, virtually extending the desktop space available to present more GUIs, provide 3D interaction capabilities with certain executed applications, allow for the user to interact with the images using the XR handheld controller 456, among other capabilities. In embodiments herein, when the user puts on the HMD device 454, a XR switching system may detect that the user has donned the HMD device 454 and seamlessly transform or convert the 2D images associated with the first application GUI 478-1 and second application GUI 478-2 into a 3D space represented in the XR environment presented to the user via the HMD device 454. Again, this seamless conversion process may include communications between the HMD wearing sensor of the HMD device to the information handling system 400, communication between the information handling system 400 and the HMD device 454 indicating that a fiducial image has been presented on the video display devices 442-1, 442-2, execution of various APIs associated with the execution of applications on the information handling system, and generation of the XR environment to present the first application GUI 478-1 and second application GUI 478-2, at least, to the user within the XR environment, among other processes described herein. In an embodiment, some or all of these processes may be orchestrated by the execution of the XR switching system described herein.

The information handling system 400 may also include one or more input/output devices. Some of these input/output devices includes a keyboard 444, a mouse 450, and a stylus 446 among other input devices that the user may use to interact with the applications being executed by the information handling system 400 such as the first application GUI 478-1 and the second application GUI 478-2 displayed on display devices 442-1, 442-2.

Figure 5:
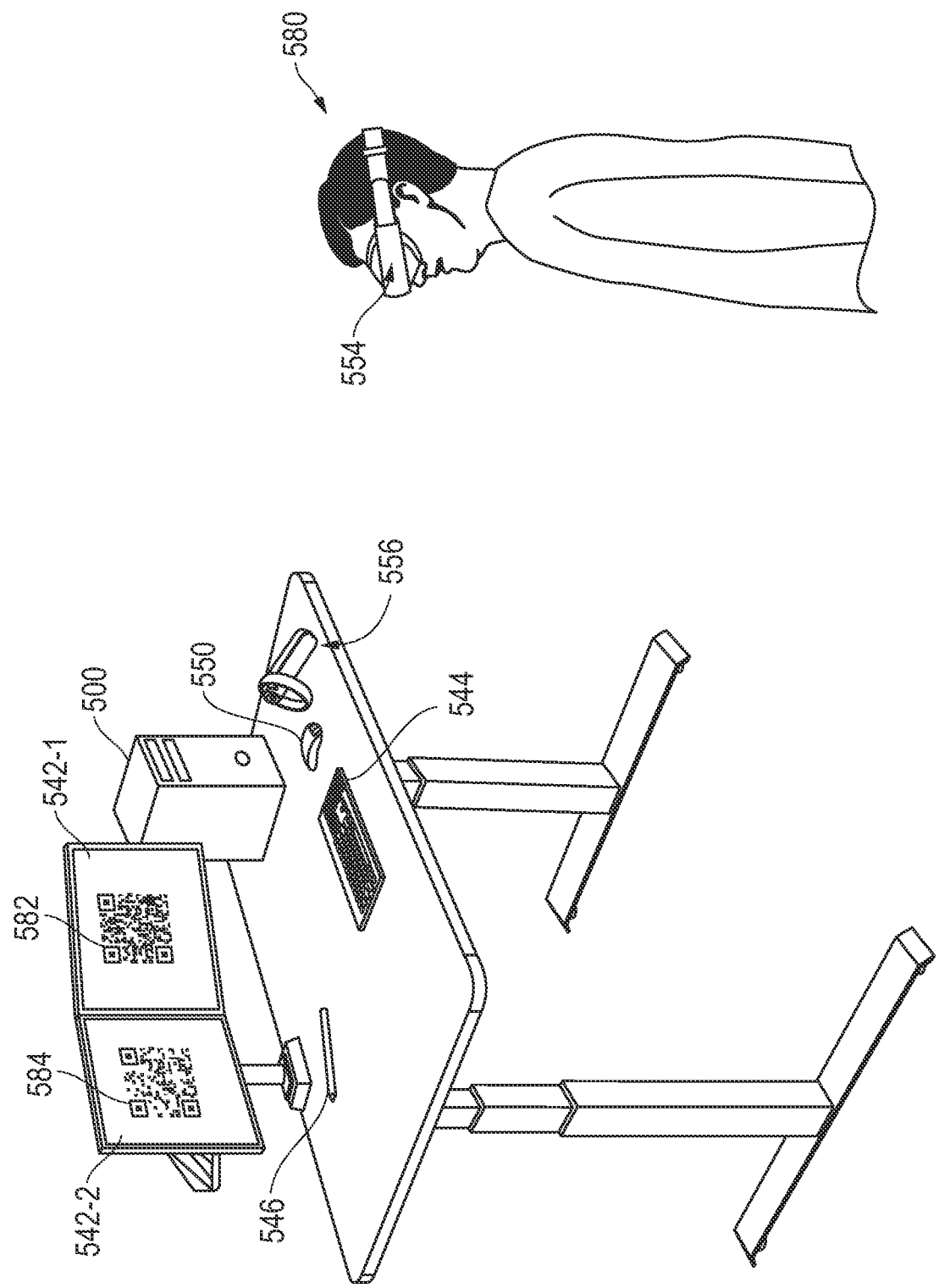
FIG. 5 is a block diagram illustrating an HMD device and information handling system with one or more video display devices according to another embodiment of the present disclosure.

FIG. 5 is a block diagram illustrating an HMD device 554 and information handling system 500 according to another embodiment of the present disclosure. During operation, the information handling system 500 may communicate with the HMD device 554 either via a wired connection or wirelessly as described herein. The operation of the HMD device 554 may not be dependent on the information handling system 500 being in operation, in an embodiment, and the HMD device 554 may be used by the user whether the information handling system 500 is operatively coupled to the HMD device 554 or not.

During operation of the information handling system 500, the user may want to interact with the applications currently being executed on the video display device 542 by the information handling system 500 on the HMD device 554. By doing so, the user may be immersed within an XR environment while interacting with those applications. In order to replicate those applications currently being executed on the desktop environment (e.g., in a two-dimensional environment), the HMD device 554 may first be initialized. The initialization process may include turning on the HMD device 554. When the HMD device 554 is powered on, a pairing process may be initiated using the OOB communications described herein in order to communicatively couple to the HMD device 554 to the information handling system 500. In an embodiment, this communication may further include any system or services information updates that may update software on the HMD device 554, for example.

The initialization process may also include the generation of fiducial images 582, 584 used by the HMD device 554 to track the location of the video display device 542-1, 542-2 of the information handling system 500 as described herein. The fiducial images 582, 584 may be particular to the video display device 542-1, 542-2 in an embodiment. For example, in addition to the fiducial images 582, 584 providing a beacon marker describing where the video display device 542-1, 542-2 is within a physical environment, the fiducial images 582, 584 may also relay data descriptive of the characteristics of the video display device 542-1, 542-2. In this example embodiment, the fiducial images 582, 584 may be a QR code that includes within its matrix metadata describing the identification of the video display device 542-1, 542-2, the physical size of the video display device 542-1, 542-2, the resolution of the video display device 542-1, 542-2, and the refresh rate of the video display device 542-1, 542-2, among other data. In an embodiment, the fiducial images 582, 584 may be generated and stored, at least initially, by the information handling system 500 for later use in the processes described herein. FIG. 5 shows such a use of the fiducial images 582, 584 being presented on the video display devices 542-1, 542-2 as, in this example, an HMD wearing sensor (not shown) detects the user 580 is wearing the HMD device 554.

In FIG. 5, the user 580 is shown wearing the HMD device 554. The HMD wearing sensor used to detect when the user 580 has donned the HMD device 554 may be any type of sensor that detects when the HMD device 554 is being worn by the user and when the HMD device 554 is not being worn by the user. It is appreciated that the HMD wearing sensor may include any other type of sensor such as an accelerometer, a contact switch placed within the HMD device 554, and/or a light sensor, a capacitive sensor, a temperature sensor, a moisture sensor, and a hall effect sensor, among other user-detection methods, systems, and devices in various embodiments. According to the methods and systems described herein, as the user wears the HMD device 554, the XR environment is displayed to the user that includes a replication of, at least, the images, windows, and applications being presented to the user via the video display device 542. By way of example, the user may be presented within the XR environment GUIs associated with the execution of a CAD application, an email application, a word processing application, a spreadsheet application, a gaming application, a videoconferencing application, a web browsing application, and a video streaming application, among others. Indeed, the user 580 may be presented with any GUI associated with any application executable on the information handling system and the present specification contemplates the display of these other types of GUIs. In order to determine when to replicate this data within the XR environment, the HMD device 554 may receive data from the HMD wearing sensor indicating when the user has donned or removed the HMD device 554 at the XR switching system. The XR switching system, in the embodiments described herein, may execute one or more APIs such that images, windows, and applications originally presented to a user, such as the first application GUI 478-1 or second application GUI 478-2 presented on video display devices 442-1, 442-2 of FIG. 4, may be replicated with XR image versions in the XR environment presented in the HMD device 554.

In one example embodiment, the HMD wearing sensor may include an eye tracking system that tracks the user's eyes via an internal camera. In this example embodiment, when the eye tracking system detects the presence of the user's eyes, the images, windows, and applications originally presented to the user on the video display devices (e.g., 442-1, 442-2, FIG. 4) may be replicated via execution of one or more APIs for respective software applications for viewing and interaction within the XR environment at the HMD device 554. Accordingly, when the eye tracking system does not detect the presence of the user's eyes, the replication of the images, windows, and applications may end and the XR switching system may cause those applications to be displayed on the video display devices (e.g., 442-1, 442-2, FIG. 4) again. The XR switching system and the HMD wearing sensor, therefore, may continuously detect whether the user is wearing the HMD device 554 or not and activate the corresponding API to replicate those images, windows, and applications accordingly in one or more types of the XR environment. It is appreciated that the HMD wearing sensor may include any other type of sensor such as an accelerometer, a contact switch placed within the HMD device 554, and/or a light sensor, a capacitive sensor, a temperature sensor, a moisture sensor, and a hall effect sensor, among other user-detection methods, systems, and devices of various embodiments.

Because the HMD device 554 and information handling system 500 are in communication with each other (e.g., wired or wirelessly), as the HMD wearing sensor detects the presence of the user, the XR switching system communicates to the information handling system 500 to generate and display the fiducial images 582, 584 on the video display devices 542-1, 542-2. The generation of the fiducial images 582, 584 prior to displaying them may be done in preparation of the user implementing the HMD device 554 and may be done in order to present, via the fiducial images 582, 584, additional information used by the HMD device 554 to replicate the image properties of the GUIs associated with the applications being executed. For example, where the video display devices 542-1, 542-2 have a specific resolution and refresh rate, that data associated with that resolution and refresh rates may be represented in the fiducial images 582, 584 presented. This allows the resolution and refresh rates of the video display device 542-1, 542-2 to be replicated within the XR environment when the HMD device 554 has detected the fiducial images 582, 584 and created the virtual XR image versions representing the GUIs, windows, and images originally presented on the video display devices 542-1, 542-2 in 2D. This information may assist the API in coordinating image appearance as well as movement or video in an XR environment. In an embodiment, the XR switching system may communicate to the information handling system 500 to generate and display the fiducial images 582, 584 on the video display device 542-1, 542-2 when the HMD wearing sensor detects the user 580 wearing the HMD device 554.

In an embodiment, the display of the first fiducial image 582 on the first video display device 542-1 and the second fiducial image 584 on the second video display device 542-2 may result from the processor of the information handling system 500 receiving a signal from the XR switching system executing on the HMD device 554 (e.g., via OOB communication) that the HMD device 554 is currently being worn by the user. At this point, the information handling system 500 may send a signal to the HMD device 554 that the fiducial images 582 and 584 are being displayed on the video display devices 542-1, 542-2 and that the HMD device 554 can now activate the pass-through camera (not shown) in order to detect those fiducial images 582, 584. Upon recognition of the fiducial images 582, 584, the HMD device 554 may display an XR environment depicting a virtual image of, at least, the images, applications, and windows previously displayed on the video display devices 442-1, 442-2 of FIG. 4 fiducials 582, 584 on location beacons for rendering and placement of XR image versions of the 2D display screen content. Here the fiducial images 582, 584 are used as location beacons for XR images to be presented in the XR environment presented by the HMD device 554 to the user. In the embodiment shown in FIG. 5, the fiducial images 582, 584 may be used to differentiate between a first video display device 542-1 and a second video display device 542-2. Here, the location of the first video display device 542-1 and the second video display device 542-2 may be distinguished using the fiducial images 582, 584 and the ability of the HMD device 554 to distinguish between the fiducial images 582, 584 as distinctive location beacons.

As described herein, the XR handheld controller 556 may be a peripheral input/output device used by the user to interact with virtual images of 2D content originally presented to the user via the video display device 542-1, 542-2 and now presented via the HMD device 554 in FIG. 5. In an embodiment, the XR handheld controller 556 may be operatively coupled to the information handling system 500 via a wireless connection using the wireless interface adapter, for example. In this embodiment, input signals from the XR handheld controller 556 may be relayed to the processor or other processing device and used as input to manipulate an XR image presented to the user at the HMD device 554. In an embodiment, the XR handheld controller 556 may be a wired connection and receive this input as described. In another embodiment, the XR handheld controller 556 may be operatively coupled to the HMD device 554 via a wireless connection via operation of the HMD wireless radio (not shown) communicating with the radio of the information handling system 500. In an example embodiment, the XR handheld controller 556 may provide input to a processing device at the HMD device 554 to manipulate an XR image presented to the user at the HMD device 554. In another example embodiment, the XR handheld controller 556, being operatively coupled to a wireless interface adapter, may provide input to the processor of the information handling system 500 to manipulate an XR image presented to the user at the HMD device 554. In one example embodiment, the GPU of the information handling system 500 may be used to process and generate the graphics used to create the XR environment at the HMD device 554.

In an embodiment, the user may interact with any number of GUIs via the images displayed in 2D on the video display devices 542-1, 542-2 and the virtual representation of those GUIs in the XR environment (e.g., AR or MR environment) when the user is wearing the HMD device 554. Here, the user may interact with these images, windows, and other application data using a keyboard 544, a stylus 546, a mouse 550, or a touchscreen of the video display devices 542-1, 542-2.

Figure 6:
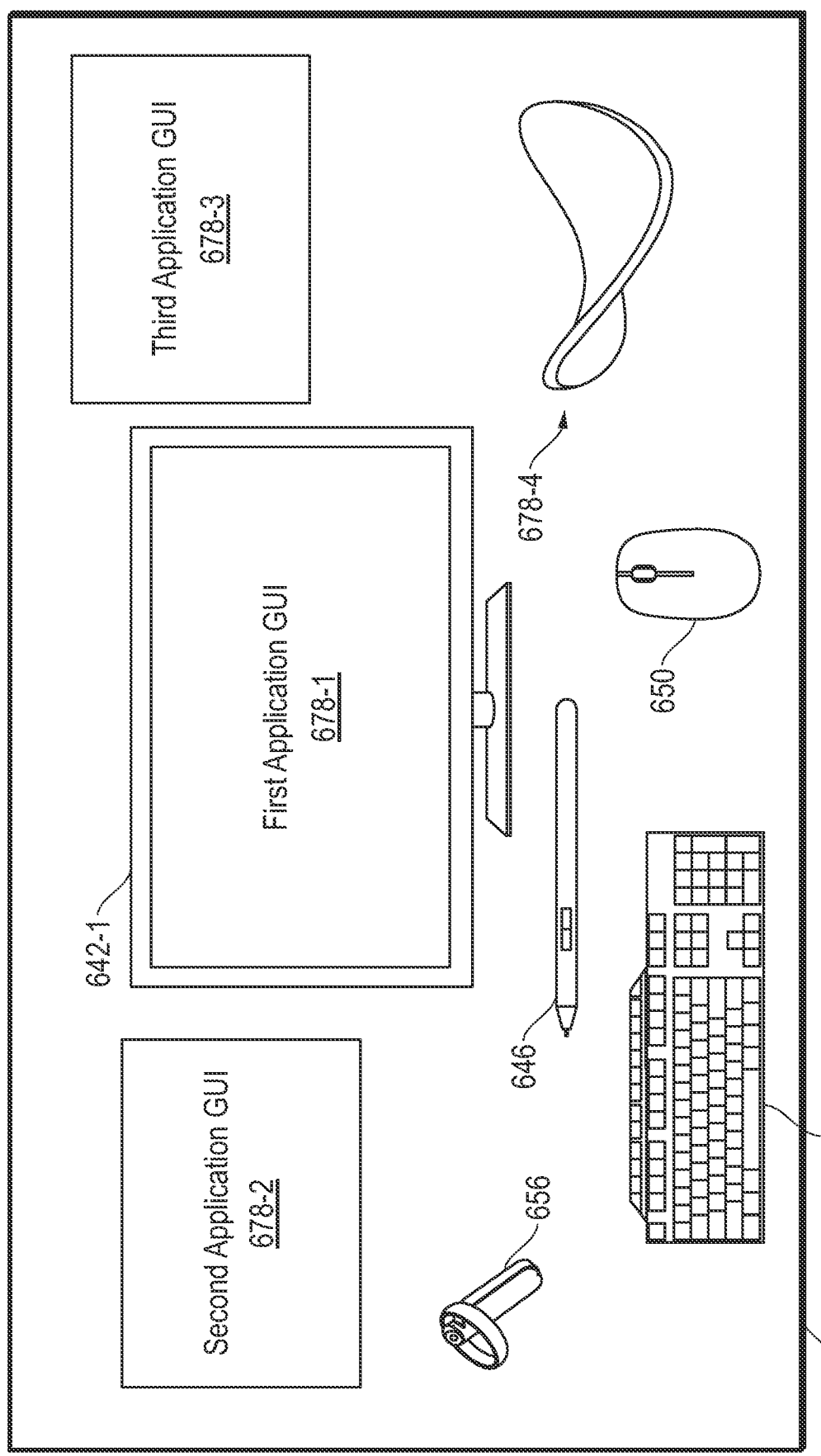
FIG. 6 is a block diagram illustrating an extended reality environment within a display device of an HMD device according to an embodiment of the present disclosure.

FIG. 6 is a block diagram illustrating an XR environment 600 within a display device of an HMD device according to an embodiment of the present disclosure. This view of the XR environment 600 may be one example of what the user sees via a video display of the HMD device as described herein. It is appreciated that the XR environment that is presented to the user may, in an example embodiment, include a VR environment that fully immerses the user within a virtual environment. Again, in this VR environment, the user may see a virtual reproduction of the video display device 642-1 near the user in the physical real-world but not of a second video display device. Along with this virtual representation of the video display device 642-1, the images, applications, and windows (e.g., first application GUI 678-1) previously presented on the video display device 642-1 may now be virtually recreated in the VR environment via execution of the APIs used by the information handling system and initiated by the XR switching system to present the executed applications and windows of one or more software applications in an XR environment. These APIs may be particular to each of the executed applications and windows and may be presented to the user in a similar look as that originally presented as first application GUI 678-1 by the information handling system via the video display device 642-1 or may be different. XR image versions of other windows of 2D images may be presented in VR environments as well. For example, a second application GUI 678-2 may be presented as XR images version of content 478-2 from a second display device 442-2 as in FIG. 4, but the second video display device 442-2 is not shown in the VR environment. In another example, a third application GUI 678-3 may be another application window or image of a software application that would be presented on one or either physical display devices 442-1 or 442-2. In another example, a fourth application GUI 678-4 may be another application window or image of a software application that would be presented on one or either physical display devices 442-1 or 442-2 as seen in FIG. 4. When the fiducial images (e.g., 582, 584, FIG. 5) are detected by the camera of the HMD device (e.g., 554, FIG. 5) and the XR environment 600 is displayed, the first application GUI 678-1, the second application GUI 678-2, the third application GUI 678-3, and the fourth application GUI 678-4 may be placed within the XR environment based on the detected fiducial images on real world video display devices functioning as location beacons. In an embodiment, one or more of these application GUIs 678-1, 678-2, 678-3, 678-4 as windows may be overlayed on each other and the user may move these windows as shown in FIG. 6 to effectively extend the workable space (e.g., extend a desktop).

When engaged in the VR environment (e.g., 600), the user may access an input device such as the HMD handheld controller 656 and manipulate the windows presenting the applications 678-1, 678-2, 678-3 or any XR images such as 678-4 such that, in the VR environment, the windows 678-1, 678-2, 678-3 or any XR images such as 678-4 may be placed outside the boundaries of the virtually represented video display device 642-1 effectively extending the desktop and workspace for the user. In an embodiment, the user may virtually move the reproduced windows revealing a desktop of one or more physical video display devices revealing any icons or shortcuts to the user. This allows the user to access other functionalities of the information handling system similar to those that would have been made available to the user via the video display device when the user is not wearing the HMD device.

It is appreciated that, in an embodiment, the XR environment 600 presented to the user initially upon wearing the HMD device may be any type of XR (e.g., VR, MR, AR). In an embodiment, the XR environment presented to the user initially upon wearing the HMD device may be defaulted to a VR environment. This initial VR environment, due to the VR environment being completely immersive, does not allow a user to see images of the keyboard 644, mouse 650, or stylus 646. In an embodiment, a virtual image of these input devices may be presented, but because the user cannot physically access these devices without knowing the location of these devices in the physical world, the images of these input devices may be presented to the user or the user may see the physical world as an indication that these input devices are available to the user if the user switches from a first type of XR (e.g., VR environment) to a second type of XR (e.g., AR or MR environment).

As described herein, in order to facilitate this switching from one XR to another, the HMD device may further use the XR switching system. In an embodiment, the XR switching system may, via a processing device, execute computer readable program code to switch from the first type of XR to the second type of XR upon detection of XR switching input. As described herein, the HMD device may be capable of generating and presenting to a user any type of XR images including AR, VR, and MR, or any other type of XR provided by the HMD device and contemplated to exist along a reality-virtuality continuum. In an embodiment, a user may cause the XR switching system to switch from a first type of XR to a second type of XR by providing XR switching input to the HMD device.

As a result of the execution of these methods and hardware, the user may, at any time, change from a first type of XR, in this example embodiment a VR environment, to a second type of XR, an AR or MR environment. For example, where the HMD device has presented a VR environment to the user as described herein after donning the HMD device, the user may provide the XR switching input as described herein either by actuating a button, actuating a virtual button, providing a gesture, or providing a voice command, among other types of input. The provision of the XR switching input to place the information handling system in either an AR or MR environment allows a user to view real-world images augmented or overlayed by the virtual images, applications, and/or windows or a virtual representation of real-world environment with XR content for images, applications, and/or windows as shown in the XR environment 600 shown in FIG. 6. As such when the AR or MR environments are presented, a user may be capable of accessing the keyboard 644, the stylus 646, the mouse 650, a trackpad (not shown), as well as the handheld controller 656 in order to provide input at the images, applications, and windows presented to the user virtually. In an embodiment, the pass-through camera may be used to provide a view of the surrounding real-world environment of provide images of the surrounding physical environment to permit a user to see and use various devices with the XR environment and XR content as well as monitor for the gesture XR switching input as described herein.

By way of example, the HMD device of the present specification may be used by an office worker executing on an information handling system, for example, an email application as indicated by the provisioning of the first application GUI 678-1, a word processing application as indicated by the provisioning of the second application GUI 678-2, a spreadsheet application as indicated by the provisioning of the third application GUI 678-3, and a computer-aided design (CAD) application as indicated by the provisioning of the fourth application GUI 678-4. The execution of each of these applications may have a window associated with these applications which are typically presented to the user via one or more video display devices such as the video display device 642-1 when the HMD device is not being worn and presented at the HMD device when it is being worn by the user. For example, the first 678-1 may typically be presented on the video display device 642-1. In an embodiment, the second application GUI 678-2 may be typically presented on a second video display device which may or may not be shown in the XR environment but may have a position in the XR environment based on the second video display device fiducial images acting as a location beacon. In an embodiment, the third application GUI 678-3 and fourth application GUI 678-4 may also typically appear on any one or more displays such as the video display device 642-1 or others not shown in the XR version of FIG. 6. These window locations are also tracked relative to one or more fiducial images associated with any of the one or more video displays in the physical environment. The HMD device may facilitate, for example, the work production of the office worker by providing an XR environment from which the user may interact with the execution of these applications.

As described herein, the XR environments replicate the windows associated with the email application, the word processing application, the spreadsheet application, and the CAD application being executed by the information handling system. In an embodiment, the windows associated with each of these executed applications may be moved by the user within the XR environment to show the virtually replicated image of the desktop, but location of those windows is still based on the fiducial location for each of the one or more real-world displays such as video display device 642-1.

The methods of interacting with the various windows of the executed applications and the input/output devices used may also vary depending on the type of application being executed and the APIs associated with the execution of those applications via the HMD device. For example, where the user wishes to interact with the word processing application being executed, the user may provide a gesture, voice command, actuate a button or icon, use keyboard 644, mouse 650, or otherwise provide the XR switching input to the executed applications via the XR environment presented on the HMD device as described herein. Because the user may want to interact with the word processing application using a keyboard 644 or a mouse 650, the user may cause the HMD device to present one of an AR or MR environment so that the pass-through camera may present the real-world image of the user's desk in order to physically access these input devices. Similarly, the user may access the keyboard 644 and mouse 650 in order to interact with the email application being executed via AR or MR. Changes to these applications are recorded in the software applications themselves as linked to the XR environment inputs by the APIs initiated by the XR switching system.

In other embodiments, the user may also be provided with three-dimensional images related to the execution of certain applications such as the CAD application. CAD applications, shown in the fourth application GUI 678-4, allow a user to draw and create objects in three dimensions for replication (e.g., via a 3D printer) in the real world. As such, when the CAD application is represented in the XR environment (e.g., VR environment), the drawing being created with the execution of the CAD application may be represented in three dimensions allowing the user to manipulate the drawing in the virtual world. As such, as the CAD application is being reproduced within the XR environment, an API associated with the CAD application may covert aspects of the CAD application from a two-dimensional GUI to a three-dimensional GUI XR image version of the 2D GUI 678-4 that would be displayed on a video display device in the physical desktop environment. Again, because the user may be allowed to manipulate the drawing represented within the CAD application, the user may want to gain physical access to input devices such as the mouse 650, a stylus 646, a trackpad, the handheld controller 656, and the keyboard 644. As such, the user may provide the XR switching input as described herein in order to switch from a VR environment to an AR or MR environment thereby allowing the user to see the location of these input devices and gain physical access to them during the operation of the CAD application on the HMD device.

When the user removes the HMD device, the HMD wearing sensor may send a signal to the XR switching system to signal the information handling system that the HMD device has been removed. The information handling system may, via execution of the APIs, convert any 3D renderings of applications back to 2D renderings for presentation of those applications on the video display device based on the fiducial image for that display. The fiducial images are removed/deleted, and all updates to the location and content are reflected again on the correct video display device.

Figure 7:
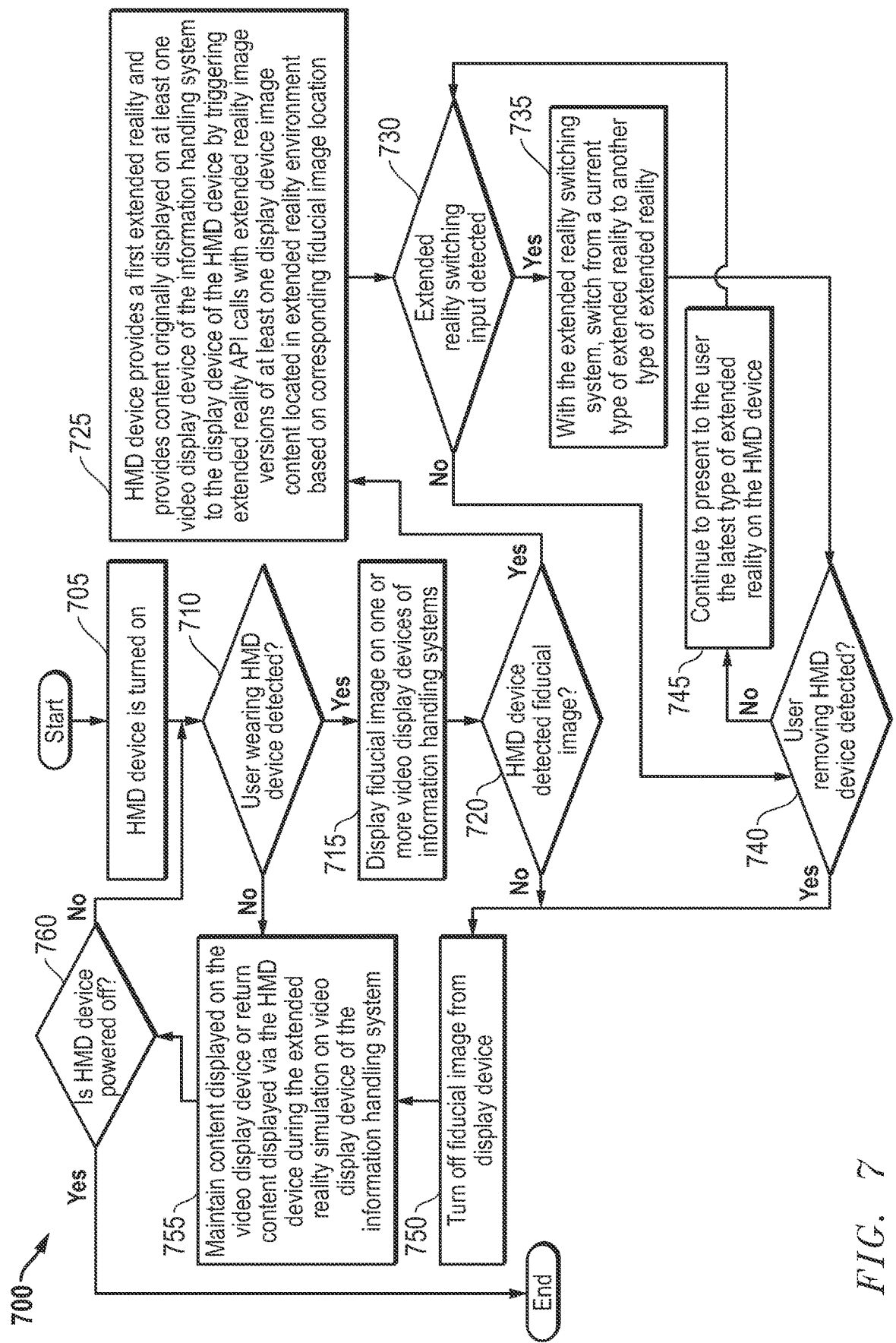
FIG. 7 is a flow diagram illustrating a method implemented at an HMD device operatively coupled to an information handling system with one or more video display devices according to an embodiment of the present disclosure.

FIG. 7 is a flow diagram illustrating a method 700 implemented at an HMD device operatively coupled to an information handling system and one or more video display devices according to an embodiment of the present disclosure. The method 700 may be executed by an HMD device operatively coupled to an information handling system similar to that described in connection with FIGS. 1, 2, and 3 in a desktop physical environment similar to FIGS. 4 and 5.

The method 700 may include, at block 705, with turning on the HMD device. In an embodiment, the HMD device may include its own power source such as a battery or A/C power adapter. In another embodiment, the HMD device may be operatively coupled to an information handling system via a wired connection that may provide power to the HMD device as well as communication between the HMD device and the information handling system. As described herein, upon powering up of the HMD device, the HMD device may first be initialized. The initialization process may include a pairing process may be initiated using the OOB communications described herein in order to communicatively couple to the HMD device to the information handling system. In an embodiment, this communication may further include any system or services information updates that may update software on the HMD device, for example. The initialization process may also include the generation of fiducial images used by the HMD device to track the location of the video display device of the information handling system as described herein. In an embodiment, the fiducial image may be generated and stored by the information handling system for later use in the processes described herein in an embodiment such that the description of the video display device associated with the fiducial image (e.g., via data presented in a QR code) may be generated. As described herein, the fiducial images may be used by the HMD device to relay characteristics of the video display device including, but not limited to, a refresh rate, a resolution, or a size of the video display device. In another embodiment, these fiducial images may be generated when an HMD wearing sensor detects that the HMD device is being worn by the user.

The method 700 may also include, at block 710, with determining whether the user is wearing the HMD device. In an embodiment, the HMD device may include an HMD wearing sensor operatively coupled to an XR switching system. The HMD wearing sensor may be any type of sensor that detects when the HMD device is being worn by the user and when the HMD device is not being worn by the user. For example, any HMD wearing sensor according to various embodiments herein. Where the HMD wearing sensor does not detect that the user is wearing the HMD device, the XR switching system is not triggered and the method 700 may maintain content displayed on the video display device at block 745.

Where the wearing sensor has detected the user wearing the HMD device at block 710, the XR switching system is triggered and the method 700 may continue with displaying the fiducial images on one or more video display devices of the information handling system in the physical desktop environment. In an embodiment, the information handling system may send a signal to the HMD device indicating that a fiducial image has been presented on one or more video display devices. Upon receipt of this signal, a camera such as a pass-through camera of the HMD device may begin to detect the fiducial image.

The method 700 may proceed with determining if the HMD device has detected the fiducial image at block 720. Where no fiducial image is detected, the method 700 may proceed to block 745 with maintaining content displayed on the video display device. Where the HMD device has detected the fiducial image at block 720, the method 700 may continue with the XR switching system initiating APIs with one or more executing software applications on the information handling system. With the APIs, the HMD device provides, at block 725, a first XR image versions of content originally displayed on the video display device of the information handling system to the display device of the HMD device by triggering these XR API calls. In an embodiment, the information handling system may include one or more APIs that allow the information handling system to cause software applications to be executed on the HMD device and XR image versions of content to be interacted with in the XR environment. These APIs may be associated with one or more sets of instructions (e.g., software algorithms), parameters, and profiles that, during execution of an XR environment at the HMD device, causes these applications to be represented to the user within the XR environment. For example, a word processing application being executed by the processor of the information handling system may include an API that, when the HMD device is being used by the user, allows that application to be executed at the HMD device with the user being allowed to interact with the word processing application.

The fiducial images used by the HMD device to track the location of the video display devices of the information handling system as described herein. The fiducial images may be particular to the video display device in an embodiment. For example, the fiducial images provide a beacon marker describing where the video display device are within a physical environment. Additionally, any fiducial may provide a beacon marker for one among a plurality of video display devices within the physical environment. This allows the fiducials to act as relative location of XR image versions of 2D software application content within an XR environment for tracking and updating interactions with these software applications and for API operation. The fiducial images may also relay data descriptive of the characteristics of the video display device. In this example embodiment, the fiducial images may be a QR code that includes within its matrix metadata describing the identification of the video display device, the physical size of the video display device, the resolution of the video display device, and the refresh rate of the video display device, among other data. Such data may be used with presentation of XR image versions from a particular video display device for the image, movement, any video playback, or the like in the XR environment on the HMD device of content from that video display device.

The method 700, in an embodiment, may include a determination as to whether the XR switching input has been detected at block 730. In an embodiment, this XR switching input may include a detection of an actuation of a button or switch formed on the HMD device that a user may activate to cause the XR switching input to be sent to the XR switching system as described herein. In another embodiment, the XR switching system may implement a gesture detection process via execution of a machine learning gesture detection algorithm by a processor (e.g., processor, GPU, HMD processor) to determine whether a user is intending to switch from a first type of XR to a second type of XR as described herein. Additionally, or alternatively, the XR switching system may implement a voice command detection process via execution of a machine learning voice command detection algorithm by a processor (e.g., processor, GPU, HMD processor) to determine whether a user is intending to switch from a first type of XR to a second type of XR as described herein.

Where it is determined that XR switching input is not detected, the method may continue at block 740 to monitor whether the user removes the HMD device with the HMD wearing sensor. If the user does not remove the HMD device, the method 700 proceeds to block 745 where the HMD system continues to present to the user the XR image version of the content originally displayed on the video display device of the information handling system at the HMD device by triggering XR API calls in the current type of XR environment operating on the HMD device. Where it is determined that XR switching input is detected at block 730, the method 700 includes triggering the XR switching system to switch from a first or current type of XR to a second type of or another type of XR with the XR switching system at block 735. For example, where the HMD device currently presents a VR environment to the user as described herein after donning the HMD device, the user may provide the XR switching input as described herein either by actuating a button, actuating a virtual button, providing a gesture, or providing a voice command, among other types of input. The provision of the XR switching input to place the HMD device in either an AR or MR environment allows a user to view real-world images augmented or overlayed by the virtual images, applications, and/or windows and XR image version of the video display device content. As such, when the AR or MR environments are presented, a user may be capable of accessing a keyboard, a stylus, a mouse, a trackpad, and the handheld controller in order to provide input at the images, applications, and windows and XR image version of the video display device content presented to the user virtually in one example embodiment. In one embodiment, the pass-through camera may be used to provide the real-world images of the surrounding physical environment or allow viewing of the surrounding physical environment including plural input-output devices as well as monitor for the gesture XR switching input as described herein.

The XR switching system may provide a user with capability of dynamically switching from viewing a VR environment, a MR environment, or an AR environment to one of the different environments. The switching process may be initiated with the user providing XR switching input as described herein. During use, however, the user may remove the HMD device and the method 700 may proceed to block 740. At block 740, the method 700 may include determining whether the user has removed the HMD device. Again, in an embodiment, an HMD wearing sensor may detect the removal of the HMD device and trigger the XR switching system. Where the HMD wearing sensor does not detect that the user has removed the HMD device at block 740, the method 700 includes continuing to present to the user with the current type (in some cases the second type) of XR on the HMD device at block 745.

Where the wearing sensor has detected that the HMD device has been removed at block 740, the XR switching system may turn off or delete the fiducial images from one or more display screens at block 750. The method 700 may continue at block 755 with the XR switching system seamlessly returning the content displayed via the HMD device during the XR simulation to the version to be displayed on each of the one or more video display devices of the information handling system. As described herein, the APIs may be executed by the information handling system to return this content back to being displayed on the video display device of the information handling system. Content and any updates/window location changes made in the environment as tracked by the API via the fiducial images on the video display devices are also translated to the video display device images. The method 700 may also include a block 760 with determining whether the HMD device is powered off. Because the user may still put the HMD device on, the HMD wearing sensor may continually monitor whether the HMD device is being worn by the user at block 710. Where the HMD device has been powered off, the method 700 may end.

The blocks of the flow diagrams of FIG. 7 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system operating a head-mounted display (HMD) device comprising:
    a processor;
    a memory;
    a power management unit (PMU);
    an HMD device interface to interface with the HMD device and to receive wear indication data from the HMD device that an HMD wearing sensor indicates that a user is wearing the HMD device;
    a video display device to display application images and to display a fiducial image when the HMD device is detected as worn by the user;
    the processor execute computer readable program code of an XR switching system to display an XR environment to the user including an XR image version of the video display application images via the HMD display device, where the video display application images are presented to the user via the video display device if no indication is received that HMD wearing sensor indicates that a user is wearing the HMD device; and
    the processor to execute computer readable program code including an application program interface (API) for converting the application images to the XR image version of the video display application images to be presented to the user such that the XR image version of the video display application images are manipulatable within the XR environment.

2. The information handling system of claim 1 further comprising:
    the processor to execute computer readable program code of an XR switching system to switch from a first type of XR to a second type of XR upon detection of XR switching input by an XR.

3. The information handling system of claim 1 further comprising:
    a wireless interface adapter to pair the information handling system to the HMD device; and the processor to generate the fiducial image, where the fiducial image includes information related to the video display device of the information handling system on which the fiducial image is displayed.

4. The information handling system of claim 1 further comprising:
the processor to receive XR switching input data from the HMD device to detect XR switching input from the user and to execute the XR switching system to switch from a first XR to a second XR at the display device for video display application images to be displayed via the HMD device.

5. The information handling system of claim 4 further comprising:
the received XR switching input data including images from a pass-through camera at the HMD device; and
the processor to execute computer readable program code for a machine learning gesture detection algorithm to detect a gesture and to classify the detected gesture to determine whether the gesture is XR switching input to switch from the first type of XR to the second type of XR.

6. The information handling system of claim 1 further comprising:
the processor to receive XR switching input data from the HMD device to detect XR switching input from the user including to a voice command detected at a microphone; and
the processor executes computer readable program code for a machine learning voice command detection algorithm to classify the detected voice command to determine whether the voice command is XR switching input to switch from the first type of XR to the second type of XR.

7. The information handling system of claim 1, further comprising:
the HMD device interface receive the wear indication data from the HMD device that the HMD wearing sensor indicates the user removing the HMD device; and
the processor to cause the video display application images presented as XR image versions to the user via the HMD display device to switch to be presented on the video display device of the information handling system and the fiducial image to be deleted.

8. The information handling system of claim 1, wherein the wear indication data of the user wearing the HMD device and the fiducial image by the HMD device enables the XR image version of the application images presented to the user via the video display device to be manipulatable within an XR environment.

9. A method implemented at a head-mounted display (HMD) device operatively coupled to an information handling system comprising:
with an HMD wearing sensor of the HMD device, detecting a user wearing the HMD device;
transmitting user detection data to a processor of the information handling system to present a fiducial image at a video display device of the information handling system in response to the user detection data;
with a processor of the HMD device executing code instructions of an XR switching system and detecting the fiducial image presented at a video display device of the information handling system, where the fiducial image indicates information related to the video display device of the information handling system; and
presenting an XR image version in an XR environment of video display application images presented to the user via the video display device by an application program.

10. The method implemented at an HMD device of claim 9 further comprising:
with a wireless interface adapter pairing the information handling system to the HMD device.

11. The method implemented at an HMD device of claim 10 further comprising:
with the processor of the HMD device, monitoring for XR switching input to, upon execution of the XR switching system by the processor of the information handling system, switch from a first type of XR simulation to a second type of XR simulation.

12. The method implemented at an HMD device of claim 10 further comprising:
with a pass-through camera of the HMD device:
detecting a gesture;
sending a gesture detection signal to the processor of the information handling system to execute a machine learning gesture detection algorithm to classify the detected gesture and determine whether the gesture is XR switching input to switch from the first type of XR to the second type of XR.

13. The method implemented at an HMD device of claim 9, wherein with the fiducial image on the video display screen, indicating a location beacon within the XR environment for locating and positioning XR images versions of video display application images to be displayed on the video display within the XR environment on the HMD display.

14. The method implemented at an HMD device of claim 9, wherein with detection of the fiducial image by the HMD device camera sensor, triggering an application program interface (API) interface with the XR image version of the video display application images to be presented to the user via the video display device such that the XR image version of the video display application images are manipulatable within an XR environment.

15. The method implemented at an HMD device of claim 9 further comprising:
with the HMD wearing sensor of the HMD device, detecting the user removing the HMD device to cause the XR image version of the video display application images to be presented to the user via the video display device of the information handling system.

16. An XR HMD device operatively coupled to a local information handling system comprising:
an HMD processor;
a memory;
a power management unit (PMU);
an HMD display device in the HMD device to present to a user an XR image of a surrounding XR environment;
an HMD wearing sensor to detect the user wearing the HMD device;
a pass-through camera to detect a fiducial image displayed by a video display device of the information handling system;
the HMD processor to receive data from an HMD wearing sensor descriptive of the user wearing the HMD device and detect the fiducial image displayed by the video display device of the information handling system; and
the HMD processor to execute computer readable program code of an XR switching system to display an XR environment to the user including an XR image version of application images presented to the user via an information handling system video display device, wherein the fiducial image on the video display device of the information handling system indicates a location beacon within the XR environment for locating and positioning XR images versions of video display application images to be displayed on the video display within the XR environment on the HMD display.

17. The XR HMD device of claim 16 further comprising: a wireless interface adapter to send an indication of the user wearing the HMD device to the local information handling system to generate the fiducial image, the fiducial image including information related to the video display device of the information handling system.

18. The XR HMD device of claim 16 further comprising: the XR switching system to, upon detection of an XR switching input, switch from a first type of XR to a second type of XR.

19. The XR HMD device of claim 16 further comprising: the HMD wearing sensor to detect a user removing the HMD device to cause the XR image version of the application images presented to the user via the HMD display device to be presented on the video display device of the information handling system and the fiducial image to be deleted.

20. The XR HMD device of claim 16, wherein detection of a user wearing the HMD device and detection of the fiducial image by the HMD device triggers an application program interface with the XR image version of the information handling system video display images to be presented to the user via the video display device such that the XR image versions are manipulatable within an XR environment and tracked for the information handling system video display images.

* * * * *